(12) United States Patent
Wang et al.

(10) Patent No.: US 12,000,375 B1
(45) Date of Patent: Jun. 4, 2024

(54) MOBILE MODULAR PLATFORMS AND METHOD FOR NEAR-SHORE ASSEMBLY OF FLOATING OFFSHORE WIND TURBINES

(71) Applicants: Jin Wang, Houston, TX (US); Darren McQuillan, Houston, TX (US)

(72) Inventors: Jin Wang, Houston, TX (US); Darren McQuillan, Houston, TX (US)

(73) Assignee: Jin Wang, Houston, TX (US)

( * ) Notice: Subject to any disclaimer, the term of this patent is extended or adjusted under 35 U.S.C. 154(b) by 20 days.

(21) Appl. No.: 18/129,393

(22) Filed: Mar. 31, 2023

(51) Int. Cl.
*F03D 13/10* (2016.01)
*F03D 13/25* (2016.01)

(52) U.S. Cl.
CPC ......... *F03D 13/126* (2023.08); *F03D 13/256* (2023.08); *F05B 2230/6102* (2013.01)

(58) Field of Classification Search
CPC ........... F05B 2230/6102; F03D 13/126; F03D 13/256
See application file for complete search history.

(56) References Cited

U.S. PATENT DOCUMENTS

| 2021/0024334 | A1* | 1/2021 | Fischer | E02B 17/021 |
| 2021/0215139 | A1* | 7/2021 | Roodenburg | B66C 13/06 |
| 2023/0296083 | A1* | 9/2023 | Delamore | B63B 73/30 114/77 R |
| 2023/0392584 | A1* | 12/2023 | Wijning | F03D 13/112 |

FOREIGN PATENT DOCUMENTS

CN 115653842 A * 1/2023

* cited by examiner

*Primary Examiner* — Moshe Wilensky

(57) ABSTRACT

A modular wind turbine assembly platform (WTAP) comprises a crane module and at least one work module for temporary storage of wind turbine components, and a modular floating hull assembly platform (FHAP) comprises a crane module and at least one work module for temporary storage of floating platform hull components and a large floating mat, wherein each of the modules comprises a rectangular hull and a plurality of retractable legs with each leg featuring a large-size footing in a water depth of 5 to 15 meters. A method for assembly of a floating offshore wind turbine comprises a floating wind assembly base (FWAB) including the modular FHAP and WTAP deployed at a near-shore site within a distance of 200 to 2000 meters from a shoreline. The method further comprises assembling a floating platform hull and lowering it into the water using the FHAP with the floating mat, then assembling and integrating a wind turbine with the floating platform hull using the WTAP.

8 Claims, 21 Drawing Sheets

(Step I)

(Step II)

(Step III)

(Step IV)

(Step V)

(Step VI)

(Step VII)

(Step VIII)

(Step IX)

(Step X)

MOBILE MODULAR PLATFORMS AND METHOD FOR NEAR-SHORE ASSEMBLY OF FLOATING OFFSHORE WIND TURBINES

CROSS-REFERENCE TO RELATED APPLICATIONS

Not applicable.

STATEMENT REGARDING FEDERALLY SPONSORED RESEARCH OR DEVELOPMENT

Not applicable.

REFERENCES

U.S. Patent Documents

U.S. Pat. No. 7,819,073 B2, Sveen et al., October 2010
U.S. Pat. No. 8,689,721 B2, Wang, April 2014
U.S. Pat. No. 9,139,266 B2, Roddier et al., September 2015
U.S. Pat. No. 9,394,035 B2, Dagher et al., July 2016

Other Publications

Christopher Allen, et al, "Definition of the UMaine VolturnUS-S Reference Platform Developed for the IEA Wind 15-Megawatt Offshore Reference Wind Turbine", National Renewable Energy Laboratory, NREL/TP-5000-76773, July 2020.

Lisa Friedman, "Sale of Leases for Wind Farms Off New York Raises More Than $4 Billion", The New York Times, Feb. 25, 2022.

Bureau of Ocean Energy Management (BOEM), U.S. Department of Interior, "Biden-Harris Administration Announces Winners of California Offshore Wind Energy Auction", Dec. 7, 2022.

Matt Shields, et al, "A Supply Chain Road Map for Offshore Wind Energy in the United States", NREL/TP-5000-84710, National Renewable Energy Laboratory, January 2023.

FIELD OF INVENTION

Embodiments of present disclosure relate generally to the field of marine structures. More specifically, embodiments of present disclosure relate to bottom-founded mobile modular platforms and method for near-shore assembly of floating offshore wind turbines.

BACKGROUND OF THE INVENTION

Floating wind platform technologies have progressed markedly in recent years with various novel floating platform concepts invented. Examples of such inventions are U.S. Pat. No. 7,819,073B2 (2010), U.S. Pat. No. 8,689,721B2 (2014), U.S. Pat. No. 9,139,266B2 (2015), and U.S. Pat. No. 9,394,035B2 (2016). Some of these novel floating wind platform concepts have been deployed in demonstration and pre-commercial scale projects. Presently, many commercial-scale offshore wind farms incorporating floating platforms with large wind turbines are in planning stages in the U.S. and globally. For example, five floating wind farms potentially totaling more than 4.6 GW in wind energy generating capacity are planned off California's northern and central coasts as a result of the first floating offshore wind lease auction held by the U.S. government in December 2022 (BOEM, December 2022). The development of these floating wind farms will necessitate the deployment of over 300 floating offshore wind turbines (FOWTs), each with a power generation capacity of at least 15 MW. According to the National Renewable Energy Laboratory (NREL), a wind turbine with a capacity of 15 MW is expected to have a hub height of 150 meters above sea level and a rotor diameter of 240 meters. This type of wind turbine is typically supported by a large semi-submersible floating platform characterized by a horizontal dimension of more than 100 meters and a draft of more than 20 meters. For cost-effective industrialized production of the FOWTs, the floating platform hull components and wind turbine components are typically manufactured in specialized factories and sea-transported to the assembly yard for final assembly and integration. In 2022, the U.S. set a national goal to achieve 15 GW of installed floating offshore wind capacity by 2035. However, the lack of adequate landside waterfront assembly yard and deep-water seaport infrastructure on the U.S. West and East Coasts presents a significant challenge for the assembly, integration, and deployment of floating offshore wind turbines. This is particularly problematic for utility scale floating offshore wind development projects that require the installation of at least 50 large FOWT units annually. One solution (prior art) to address the above problem is to upgrade existing seaport facilities or build new ones close to the floating offshore wind farm. Specifically, to meet the requirements of large-scale efficient assembly and integration of FOWTs, a conventional seaport facility (as shown in FIG. 1) would need to have a waterfront yard area of 50 to 100 acres, a wharf quayside length of 300 to 500 meters with water depth more than 10 meters, and a deep-water ocean passage channel of more than 100 meters wide. However, this approach would involve a substantial investment of billions of dollars and a prolonged period of time of permitting and construction, normally 5 years or longer. The distance of the existing seaports to the offshore wind farms will also need to be carefully considered, as the sea-towing of the FOWTs over long distances can add significantly to the logistics costs and may result in increased risk of accidents. Furthermore, it would have potential negative impacts on the coastal environment due to the expansion and development of large shoreside land and dredging of deep-water wharf quayside and passages.

There is a strong need for cost-effective and environmental-friendly solutions with new types of infrastructure and methods that do not rely on traditional assembly yards and seaports.

SUMMARY OF THE INVENTION

The present disclosure overcomes the aforementioned challenges by providing bottom-founded modular platforms and a method for near-shore assembly and integration of floating offshore wind turbines. Specifically, the invention includes two types of modular platforms, a modular wind turbine assembly platform (WTAP) and a modular floating hull assembly platform (FHAP). The WTAP is primarily utilized for assembly and integration of an offshore wind turbine including the tower, nacelle, and rotor blades onto a floating platform hull. It comprises a plurality of modules of similar size and construction including one crane module supporting a large crane with a long boom and at least one work module providing a work and laydown area for temporary storage of wind turbine components. The FHAP is primarily used for assembly of a floating platform hull which can be a semi-submersible, spar, or tension leg platform. It comprises a plurality of modules of similar size and construction including one crane module supporting a large crane with a long boom and at least one work module providing a work and laydown area for temporary storage of floating platform hull components. In addition, the FHAP includes a large floating mat which provides a dry area above the water level for assembly of the floating platform hull components. The floating mat can be lowered to the seabed by water ballast to allow the completed floating platform hull to float freely in the water.

The modules of both the WTAP and FHAP are designed with standardized dimensions and each of the modules is supported by a plurality of retractable modular legs. These legs extend vertically from above the waterline to the seafloor, with each leg featuring a large-size footing embedded below the seabed for added stability. The WTAP and FHAP can be deployed independently at different locations for their intended purposes or together at one site to form a floating wind assembly base (FWAB).

The present invention further comprises a method for near-shore assembly and integration of a complete floating offshore wind turbine unit using the FWAB. Specifically, the FWAB comprises the modular wind turbine assembly platform (WTAP) and the modular floating hull assembly platform (FHAP) with the floating mat. The method involves deploying the modular FHAP and WTAP together at a near-shore site within a distance of 200 to 2000 meters from the shoreline in water depths ranging from 5 to 15 meters. The method further comprises assembling a floating platform hull and lowering it in the water utilizing the modular FHAP with the floating mat, then integrating a wind turbine consisting of a tower, nacelle, and rotor blades onto the floating platform hull using the WTAP to complete the entire floating offshore wind turbine unit at the near-shore site.

In some embodiments as shown in FIGS. 2A and 2B, the mobile modular wind turbine assembly platform (WTAP) consists of three modules arranged in an end-to-end configuration with one crane module in the middle and two work modules. Each module has a rectangular hull of barge-like construction typically with a length of 40 to 70 meters, a width of 30 to 60 meters and a height of 5 to 15 meters, and a plurality of legs located at the corners of the rectangular hull. The crane module is equipped with a large crane with a long boom which can lift the wind tower, turbine nacelle and rotor blades and install them onto the top of the floating platform hull. The two work modules are used to temporarily store a plurality of wind turbine components, one for wind tower sections and one for nacelles and rotor blades. The two work modules are equipped with an adjustable outrigger system which is designed to eliminate the relative horizontal motions between the work modules and the floating platform hull during assembly of the wind turbine tower, nacelle, and rotor blades.

In some embodiments as shown in FIGS. 7A to 8B, each of the modules comprises a barge-like rectangular hull with a flat deck and a flat bottom, and a set of retractable modular legs. The rectangular hull includes a plurality of watertight compartments equipped with a ballast system to pump water in or out during operations. Each of the modular legs includes an upper part comprising a vertical leg post and a jacking and locking system, and a lower part comprising a large-size leg footing, which is preferably a suction caisson or bucket foundation. Prior to deployment, the modular legs are retracted upward vertically to allow the rectangular hull to float freely. During deployment, the modular legs are lowered to the seabed, the leg footing is embedded into the soil by ballasting the hull and suction forces, and the leg post is rigidly connected to the rectangular hull by using the jacking and locking system. This process can be reversed by pumping water into the leg footing caisson to create an overpressure and de-ballasting the rectangular hull, thus allowing the module to be relocated and redeployed.

In some embodiments as shown in FIGS. 9 and 10, the mobile modular floating hull assembly platform (FHAP) is composed of three modules arranged in an end-to-end configuration with one crane module in the middle and two work modules. Each module features a rectangular hull supported by four modular legs each having a large-size leg footing firmly embedded into the seafloor. The work modules are used to store floating platform hull components. The FHAP also includes a large modular floating mat which is designed to float on water and support heavy loads such as the floating platform hull components. The crane module includes a large crane with a long boom that is operable to lift the floating platform hull components and set them onto the top of the floating mat which is secured to the FHAP by mooring lines and bumpers.

In some embodiments as shown in FIG. 11, the floating mat comprises four rectangular mat modules with a flat deck and flat bottom. The mat modules are connected by a variety of external and internal connectors, as well as link beams. Designated areas are provided for supporting heavy loads on the deck of the floating mat. Each mat module includes a vertical stability column located at a corner, as well as multiple watertight compartments and a ballast system (not shown) for pumping water in and out of the compartments during lowering and floating up operations.

In some embodiments as shown in FIG. 13, the near-shore modular floating wind assembly base (FWAB) comprises a modular floating hull assembly platform (FHAP) with a large crane and a modular floating mat and a modular wind turbine assembly platform (WTAP) with a large crane. The FHAP and WTAP are arranged in an end-to-end configuration located at a near-shore site at a distance between 200 to 2000 meters from a shoreline in a water depth ranging between 5 to 15 meters. The FWAB typically has an overall length of 200 to 400 meters and a width of 30 to 60 meters. The FWAB is oriented with its long side towards the ocean to provide a protected area on the shoreline side from the waves for waterborne operations such as assembling the floating platform hull components on the floating mat and assembling the wind turbine components onto the floating platform hull.

In some embodiments as shown in FIG. 14 to FIG. 24, a method for assembling a floating platform hull and integrating it with a wind turbine using the FWAB comprises ten steps in three phases. The first phase is assembling the WTAP and FHAP modules to complete the near-shore FWAB and transporting and storing the floating platform hull components and wind turbine components on the FHAP and WTAP. The second phase is assembling the floating platform hull components on the floating mat and deploying the completed floating platform hull into the water by lowering the floating mat through water ballasting. The third phase is moving the floating platform hull from the FHAP to the WTAP by using a pulling system, and assembling and integrating the wind turbine components, including the tower, nacelle, and rotor blades onto the floating platform hull to form a complete floating offshore wind turbine unit.

In summary, the invention presents a cost-effective, flexible, and efficient alternative to the conventional method for assembling floating platform hulls and floating offshore wind turbines. This is achieved through the use of the mobile modular platforms, namely the floating hull assembly platform (FHAP) and wind turbine assembly platform (WTAP), deployed at a near-shore location, thus eliminating the need for landside waterfront facilities. Specifically, the mobile modular platforms and the method described in the present disclosure offer distinct features and advantages for large-scale assembly and integration of floating offshore wind turbines. First, by incorporating modular design, the platform modules can be cost-effectively fabricated at existing shipyards, transported to, and assembled on site at a near-shore location with suitable water depth to form a near-shore floating wind assembly base (FWAB) not far from the floating offshore wind farm. This provides a low-cost one-stop facility for assembly of the floating platform hull and integration of the wind turbine components to form a complete floating offshore wind turbine unit. Second, the FWAB does not require landside waterfront assembly yards and seaports, nor deep-water passage dredging, and it can be relocated after the project without leaving any permanent structures at the site. As a result, the potential negative impact to the coastal environment is minimized Third, the concept and method of the mobile modular wind turbine assembly base can be readily adapted to different floating wind project requirements, making it a versatile solution for large-scale deployment of floating offshore wind turbines not only in the U.S. but also worldwide, especially in areas where there is a lack of suitable assembly yards and seaports. Fourth, it is highly feasible to cost-effectively fabricate, assemble, transport, and install the modular platforms utilizing local resources and existing shipyard facilities without import from overseas, thus creating new jobs and providing economic benefits for the local economy. It is estimated that the capital cost of the FWAB would be less than one-third compared to a conventional landside waterfront assembly yard and deep-water seaport solution. The time required to construct the FWAB is estimated to be less than two years, much shorter than the conventional solution. Fifth, the mobile modular design of the WTAP and FHAP allows them to be deployed independently at different locations for their intended purposes, providing further flexibility to projects for large-scale deployment of floating wind turbines.

DETAILED DESCRIPTION OF THE INVENTION

The present invention relates to bottom-founded mobile modular platforms and a method for near-shore assembly and integration of floating offshore wind turbines without using landside assembly yards and seaports. Before explaining the invention in detail, it is to be understood that the present invention is not limited to the embodiments as disclosed and that it can be practiced or carried out in various ways. It is understood that although the disclosed modular platforms and construction method are generally intended for the assembly and integration of floating wind platforms and offshore wind turbines in water depth from 5 to 15 meters, they can also be used in water depth greater than 15 meters, and with any type of floating platforms and topsides not limited to offshore wind turbines. In the text, if not specified, the use of relational terms, such as, but not limited to, "top," "bottom," "left," "right," "upper," "lower," "deeper," "shallower," "up," "down," "side," "end" and the like is for clarity in specific reference to the figures and is not intended to limit the scope of the invention or the claims.

Preferred embodiments of the present invention are shown in FIGS. 2A through 25. Detailed descriptions are as follows.

Figure 1:
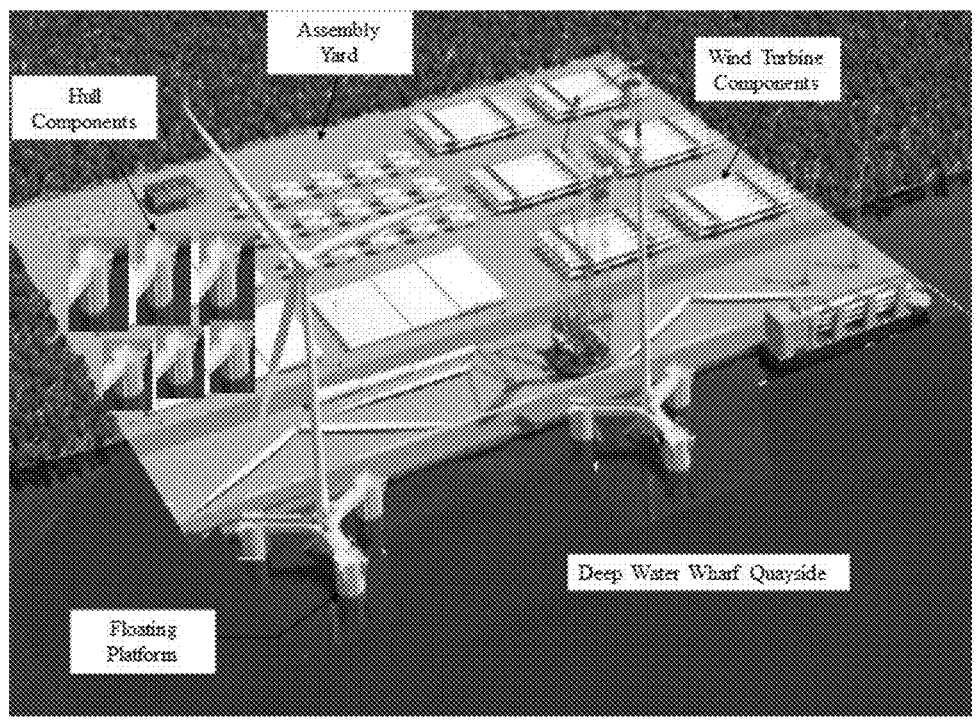
FIG. 1 is a schematic perspective view of an exemplary landside waterfront assembly yard and seaport for floating offshore wind turbine assembly and integration according to the prior art.
Figure 2A:
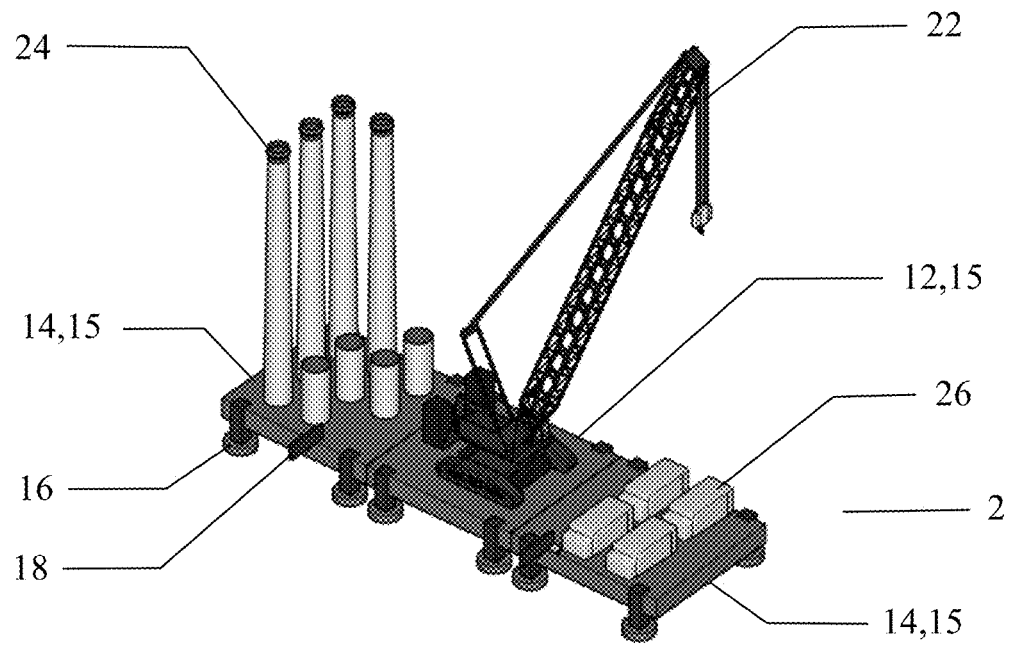
FIG. 2A is a schematic perspective view of an exemplary embodiment of a mobile modular wind turbine assembly platform in accordance with the present invention.

With reference to FIG. 2A, in some embodiments, a modular wind turbine assembly platform 2 comprising one crane module 12 and two work modules 14 wherein the crane module 12 is arranged in the middle between the two work modules 14 in an end-to-end configuration. Each of the modules 12 and 14 has a rectangular hull 15 of barge-like construction with a flat top deck and a flat bottom and four modular legs 16. The crane module 12 is equipped with a large crane 22 with a long boom. A plurality of wind turbine components 24 and 26 are stored temporarily on the two work modules 14, one for wind tower sections 24 and one for turbine nacelles 26. Each of the work modules 14 is equipped with an adjustable outrigger system 18. The modules 12 and 14 are typically of a standard size. For large offshore wind turbines with more than 10 MW power generating capacity, each module has a preferred length of 40 to 70 meters, a width of 30 to 60 meters and a height of 5 to 15 meters.

Figure 2B:
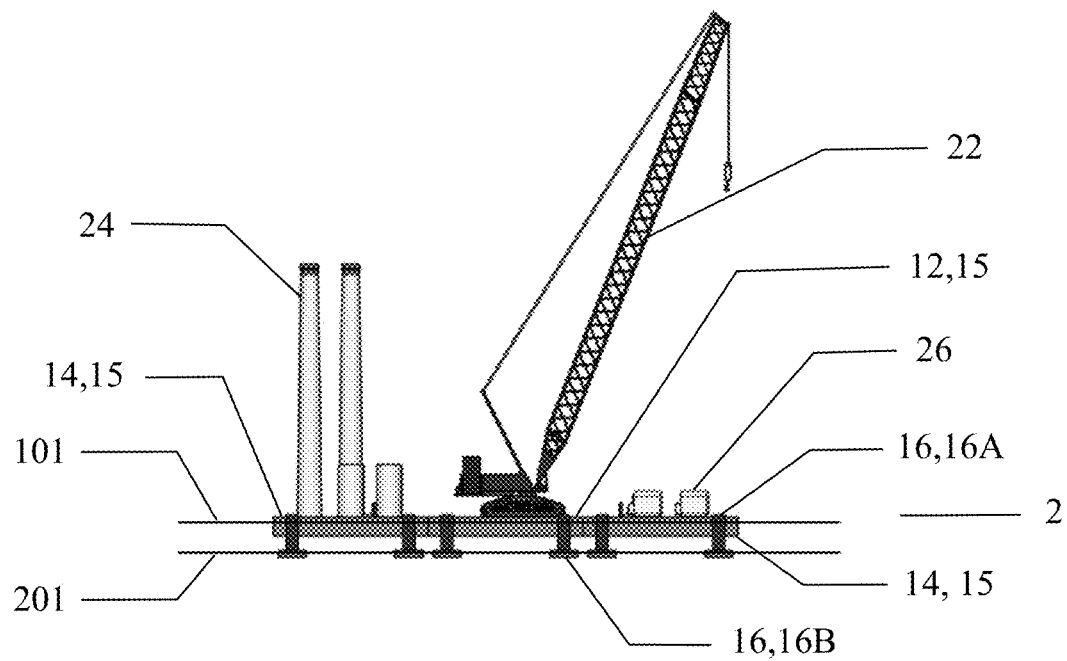
FIG. 2B is a schematic side view of an exemplary embodiment of the mobile modular wind turbine assembly platform in accordance with the present invention.

With reference to FIG. 2B, in some embodiments, the modular wind turbine assembly platform 2 comprising one crane module 12 and two work modules 14 is deployed in a water depth preferably ranging between 5 to 15 meters wherein a top of each of the rectangular hulls 15 of the modules 12 and 14 is above a waterline 101 providing a dry storage area for the wind turbine components 24 and 26, and a bottom below the waterline 101 and above a seafloor 201. The modules 12 and 14 of the modular wind turbine assembly platform 2 is supported by the modular legs 16 wherein each has an upper part 16A rigidly connected to each of the rectangular hulls 15 of the modules 12 and 14, and a lower part 16B firmly embedded below the seafloor 201.

Figure 3:
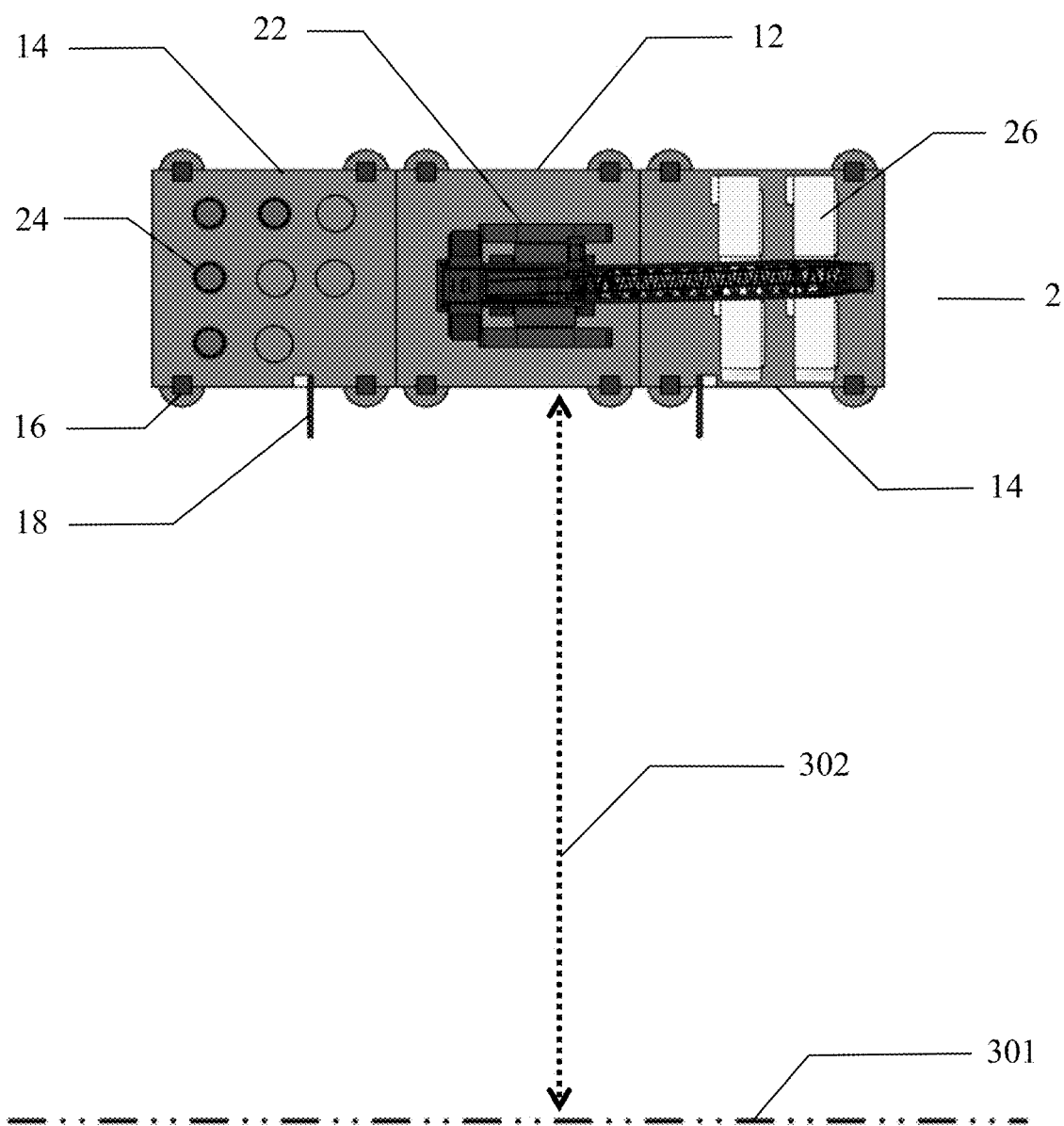
FIG. 3 is a schematic top view of an exemplary embodiment of the mobile modular wind turbine assembly platform in accordance with the present invention.

With reference to FIG. 3, in some embodiments, the modular wind turbine assembly platform 2 consisting essentially of one crane module 12 and two work modules 14 is deployed in a water at a site near a shoreline 301 at a distance 302 ranging between 200 to 2000 meters. The modular wind turbine assembly platform 2 has a long side facing the shoreline and the adjustable outrigger system 18 is on the shoreline side.

Figure 4:
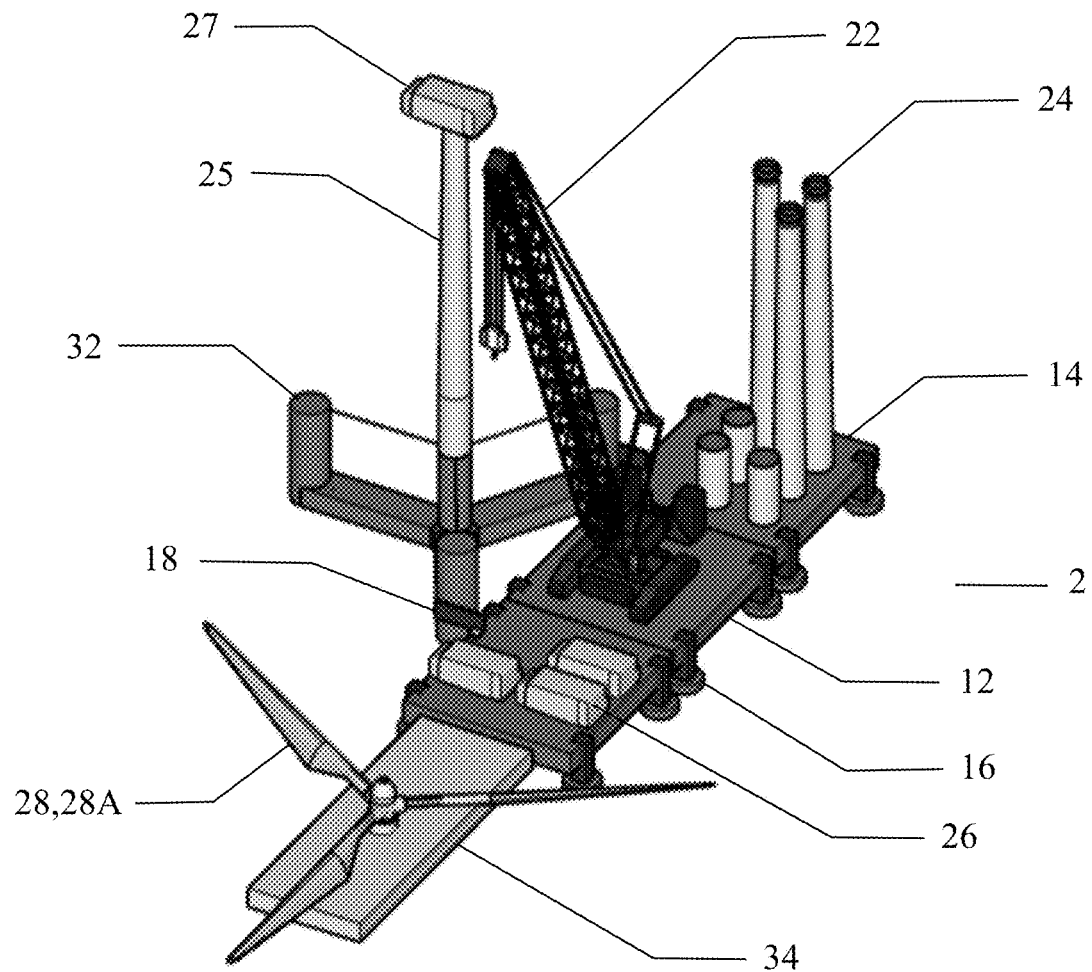
FIG. 4 is a schematic perspective view of an exemplary embodiment of the mobile modular wind turbine assembly platform with a floating platform hull and transportation barge.

With reference to FIG. 4, in some embodiments, the modular wind turbine assembly platform 2 is in an operation mode in which a wind tower 25 and a nacelle 27 are assembled and integrated to a semi-submersible floating platform hull 32 secured to a side of the crane module 12 and the work modules 14 by the adjustable outrigger system 18. A transportation barge 34 carrying a wind turbine rotor blades assembly 28 is secured to an end of the wind turbine assembly platform 2 wherein the large crane 22 with a long boom is used to lift the rotor blades assembly 28 from the transportation barge 34 and integrate the rotor blades assembly 28 with the nacelle 27 on top of the wind tower 25. Additional wind turbine components such as tower sections 24 and nacelles 26 are stored on the work modules 14.

It is noted that wind turbine rotor blades 28A can also be temporarily stored separately on one of the work modules 14 even though FIG. 4 shows the pre-assembled rotor blades assembly 28.

Figure 5:
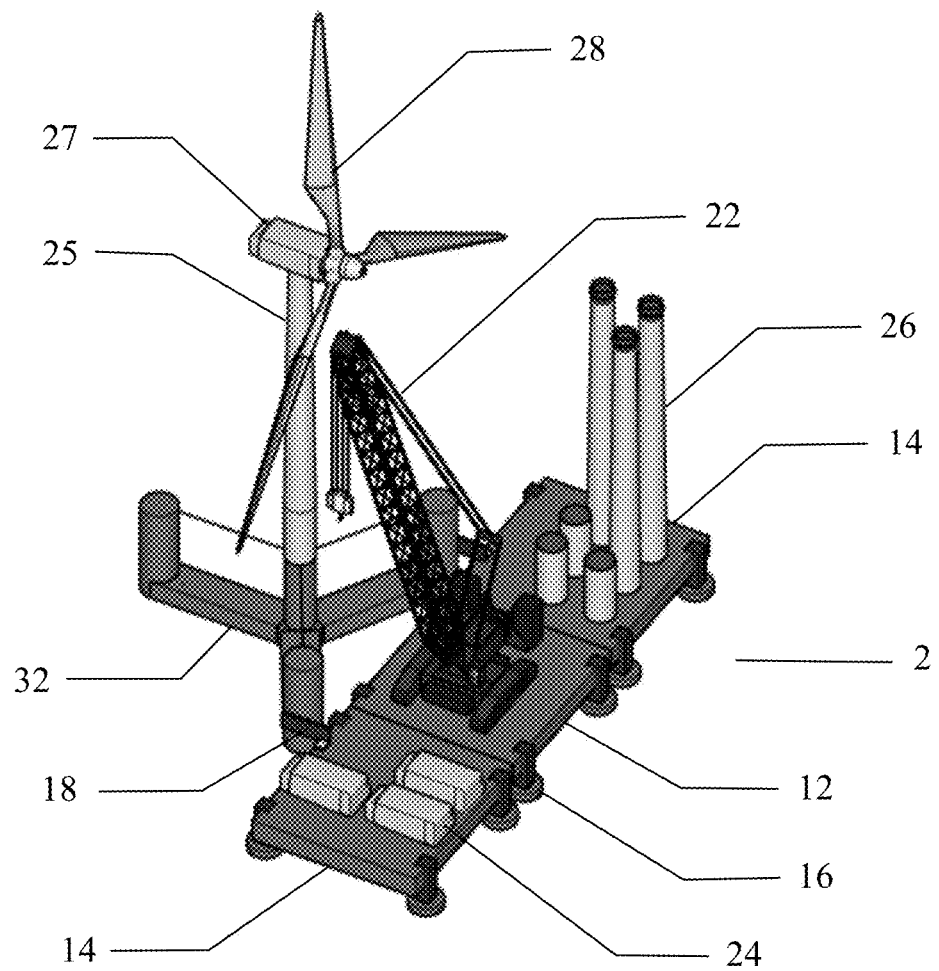
FIG. 5 is a schematic perspective view of an exemplary embodiment of the mobile modular wind turbine assembly platform with a fully integrated floating offshore wind turbine unit.

With reference to FIG. 5, in some embodiments, the assembly and integration the wind turbine consisting of the wind tower 25, nacelle 27 and rotor blades assembly 28 to the floating platform hull 32 at the side of the modular wind turbine assembly platform 2 is completed. The adjustable outrigger system 18 is used to eliminate the relative horizontal motions between the work modules 14 and the floating platform hull 32 during lifting and assembly operations of the wind turbine tower 25, nacelle 27, and rotor blades assembly 28 by the large crane 22.

Figure 6:
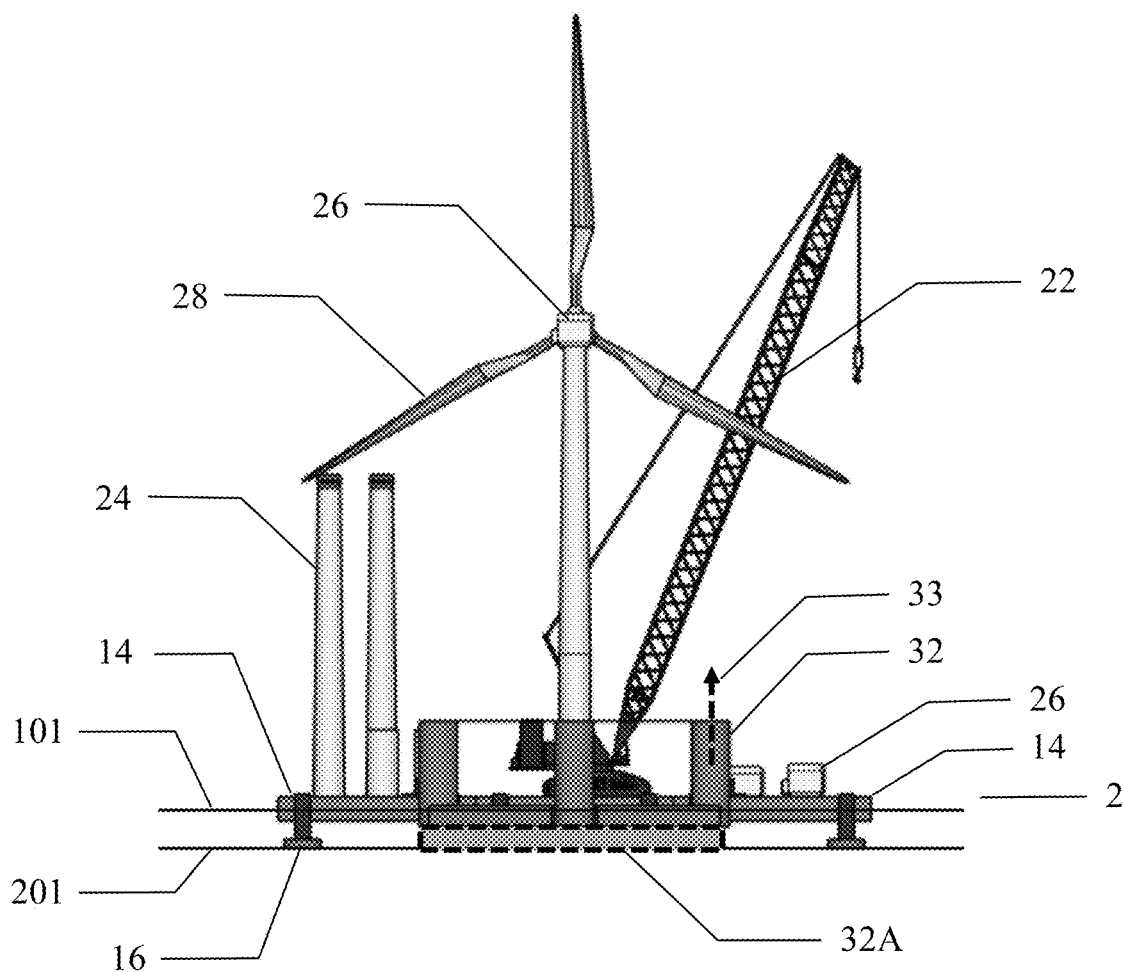
FIG. 6 is a schematic side view of an exemplary embodiment of the mobile modular wind turbine assembly platform with the fully integrated floating offshore wind turbine unit.

With reference to FIG. 6, in some embodiments, as an alternative, the integration the wind turbine consisting of the wind tower 25, nacelle 27 and rotor blades assembly 28 to the floating platform hull 32 at the side of the modular wind turbine assembly platform 2 can be done with a bottom 32A of the floating platform hull 32 temporarily sitting on the seafloor 201 using ballast water. This alternative makes the lifting and assembling operations of the wind turbine components 25, 27 and 28 easier. After the wind turbine components 25, 27 and 28 are fully integrated with the floating platform hull 32, the ballast water is pumped out to allow the floating platform hull 32 to float freely in upward direction 33.

Figure 7A:
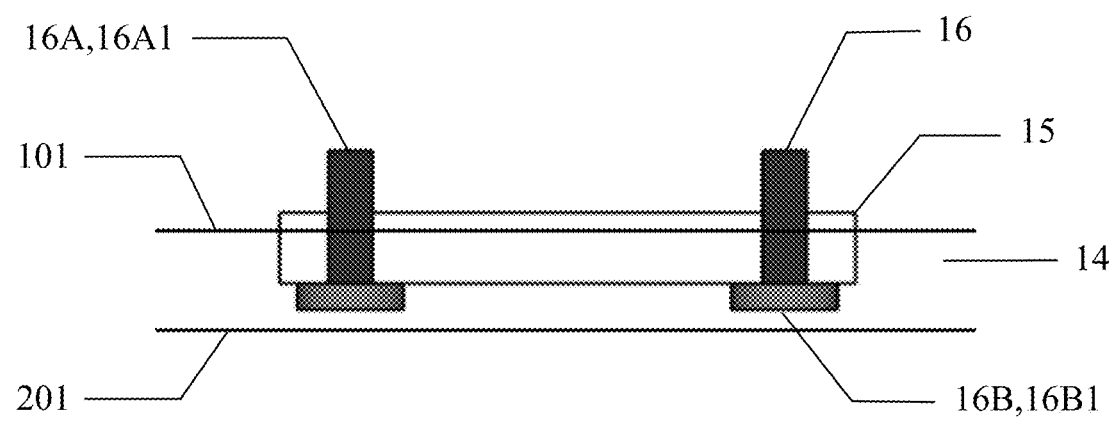
FIG. 7A is a schematic side view of an exemplary embodiment of a module of the mobile modular wind turbine assembly platform in temporary floating configuration.

With reference to FIG. 7A, in some embodiments, a module 14 in a temporary floating configuration comprises a rectangular hull 15 with a flat top deck above a waterline 101 and a flat bottom above a seafloor 201 and a plurality of retractable modular legs 16 comprising an upper part 16A and a lower part 16B wherein the modular legs 16 are retracted upward. The upper part 16A of the modular leg 16 comprises a vertical leg post 16A1 and a jacking and locking system (not shown), and the lower part 16B comprises a large-size leg footing 16B1, which is preferably a suction caisson or bucket foundation. The rectangular hull 15 of the module 14 is made of steel or concrete materials.

Figure 7B:
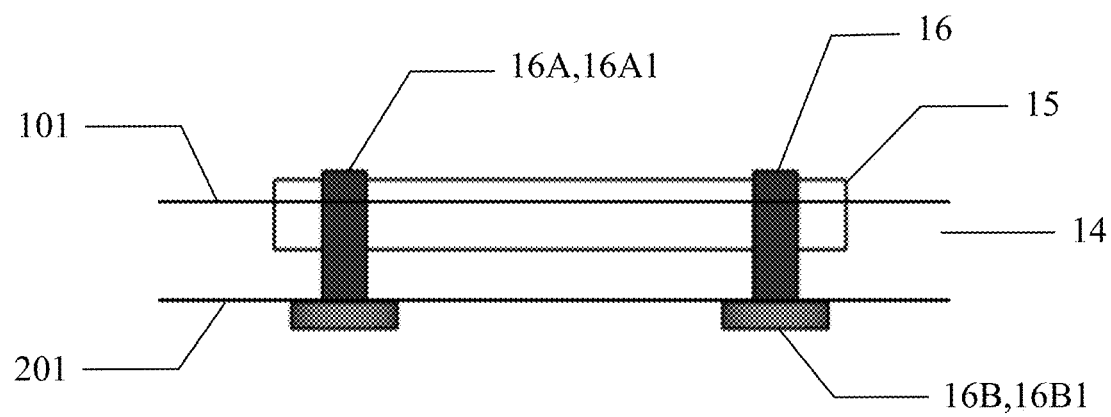
FIG. 7B is a schematic side view of an exemplary embodiment of a module of the mobile modular wind turbine assembly platform in installed bottom-founded configuration.

With reference to FIG. 7B, in some embodiments, the module 14 in an installed bottom-founded configuration comprises the rectangular hull 15 with the flat top deck of the above the waterline 101 and the flat bottom above the seafloor 201 with a gap in between in a water depth 5 to 15 meters. The modular legs 16 are lowered down with the upper part 16A with the vertical leg post 16A1 rigidly coupled to the rectangular hull 15 and the lower part 16B with the large-size leg footing 16B1 firmly embedded into the seafloor 201.

It is noted that the gap between the flat bottom of the rectangular hull 15 and the seafloor 201 varies with the water depth. For certain sites or project applications, it may be advantageous to allow the bottom of the rectangular hull 15 to make direct contact with the seafloor 201.

Figure 8A:
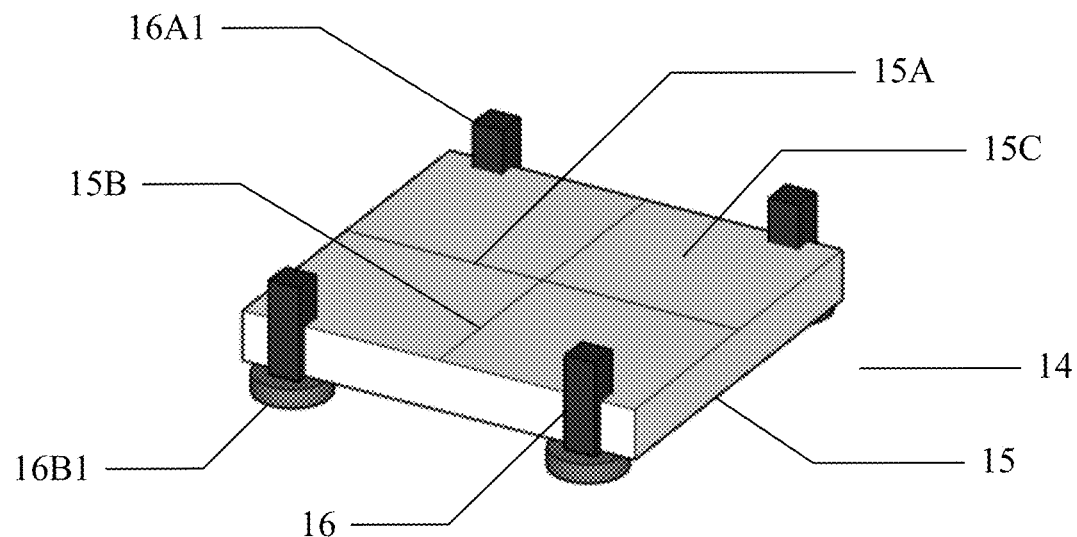
FIG. 8A is a schematic perspective view of an exemplary embodiment of the module of the mobile modular wind turbine assembly platform in floating condition before installation.
Figure 8B:
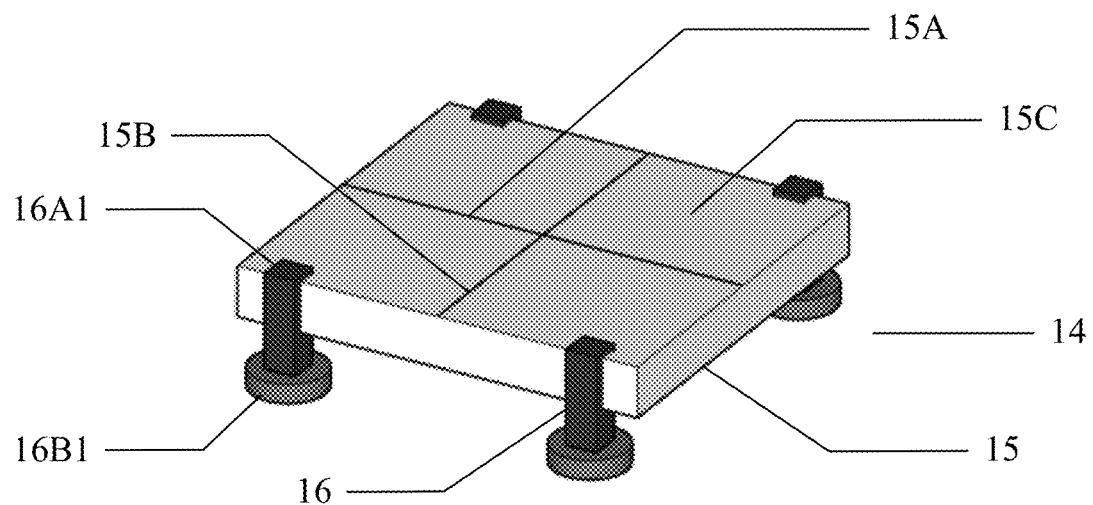
FIG. 8B is a schematic perspective view of an exemplary embodiment of the module of the mobile modular wind turbine assembly platform in bottom-founded condition after installation.

With reference to FIGS. 8A and 8B, in some embodiments, the rectangular hull 15 of the module 14 comprises a plurality of vertical bulkheads 15A and 15B as well as four watertight compartments 15C. The module 14 is equipped with a ballast system (not shown) to pump water in or out the watertight compartments 15C. Specifically, the ballast system is used to control the draft of the module 14 when it is in temporary floating condition, and vertical loads in the modular legs 16 when the module 14 is in bottom-founded installed condition. Each of the modular legs 16 has the vertical leg post 16A1 coupled at a lower end to the large-size leg footing 16B1, which is preferably a suction caisson or a bucket foundation. The module 14 with the rectangular hull 15 and the retractable modular legs 16 can be fabricated like a barge at a shipyard anywhere and transported to the near-shore site. Prior to deployment, the modular legs 16 are retracted upward vertically to allow the module 14 to float freely, as shown in FIG. 8A. During deployment, a first step is to lower the legs 16 until the leg footing 16B1 touches the seafloor, a second step is to couple the vertical leg post 16A1 rigidly to the rectangular hull 15, a third step is to embed the leg footing 16B1 firmly into a soil by ballasting the rectangular hull 15 and suction forces, as shown in FIG. 8A. This process can be reversed by pumping water into the suction caisson of the leg footing 16B1 to create an overpressure and de-ballasting the rectangular hull 15 to extract the leg footing 16B1 and allow the module 14 to float freely.

It is noted that the above description of the fabrication, transportation, deployment, and relocation for the module 14 is also applicable to the module 12 as well as the modular wind turbine assembly platform 2 as illustrated in FIG. 2A, thus making it highly mobile. It is also noted that for certain sites or project applications, it may be advantageous to build the modular wind turbine assembly platform 2 as one piece at a shipyard before deployment to a near-shore site. In this case, the modular wind turbine assembly platform 2 comprises one large module which has the equivalent size and function of the three modules combined as described earlier and illustrated in FIGS. 2A, 2B through FIG. 8B.

Figure 9:
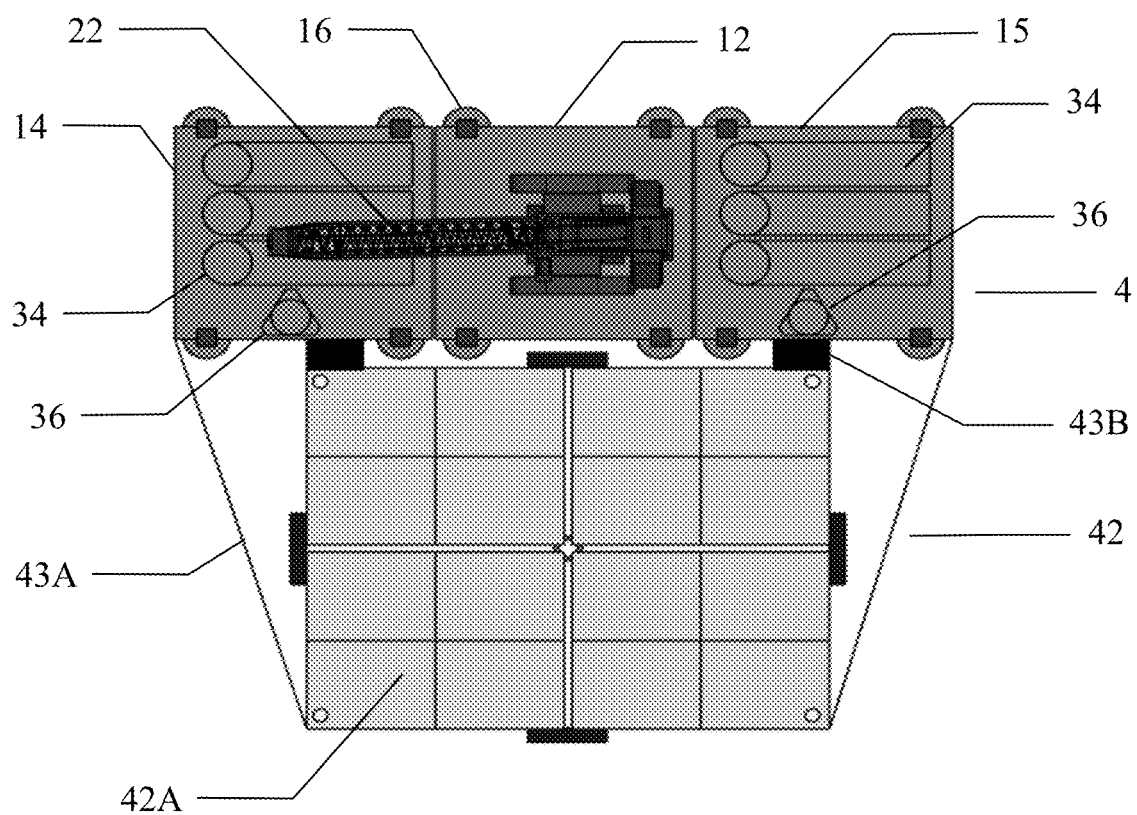
FIG. 9 is a schematic top view of an exemplary embodiment of a mobile modular floating hull assembly platform with a floating mat in accordance with the present invention.

With reference to FIG. 9, in some embodiments, a modular floating hull assembly platform 4 comprises one crane module 12 and two work modules 14 wherein the crane module 12 is arranged in the middle between the two work modules 14 in an end-to-end configuration as well as a large modular floating mat 42 having four rectangular mat modules 42A with a flat top deck and a flat bottom designed to float on a water providing a large dry area for assembly of a floating platform hull. Each of the modules 12 and 14 features a rectangular hull 15 of barge-like construction with a flat top deck and a flat bottom supported by four modular legs 16. The work modules 14 are configured to temporarily store a plurality of floating platform hull components 34 and 36. The crane module 12 includes a large crane 22 with a long boom that is operable to lift the floating platform hull components 34 and 36 and set them onto the modular floating mat 42 which is secured to the modules 12 and 14 by mooring lines 43A and bumpers 43B. For assembly of a typical semi-submersible floating platform hull, the modules 12 and 14 are preferably of a standard size, each having a length of 40 to 70 meters, a width of 30 to 60 meters and a height of 5 to 15 meters, and the modular floating mat 42 has a length of 100 to 150 meters, a width of 80 to 130 meters, and height of 2 to 5 meters. The modular floating hull assembly platform 4 is typically deployed at a site near a shoreline at a distance ranging between 200 to 2000 meters with a long side facing the shoreline and the floating mat 42 on the shoreline side.

Figure 10:
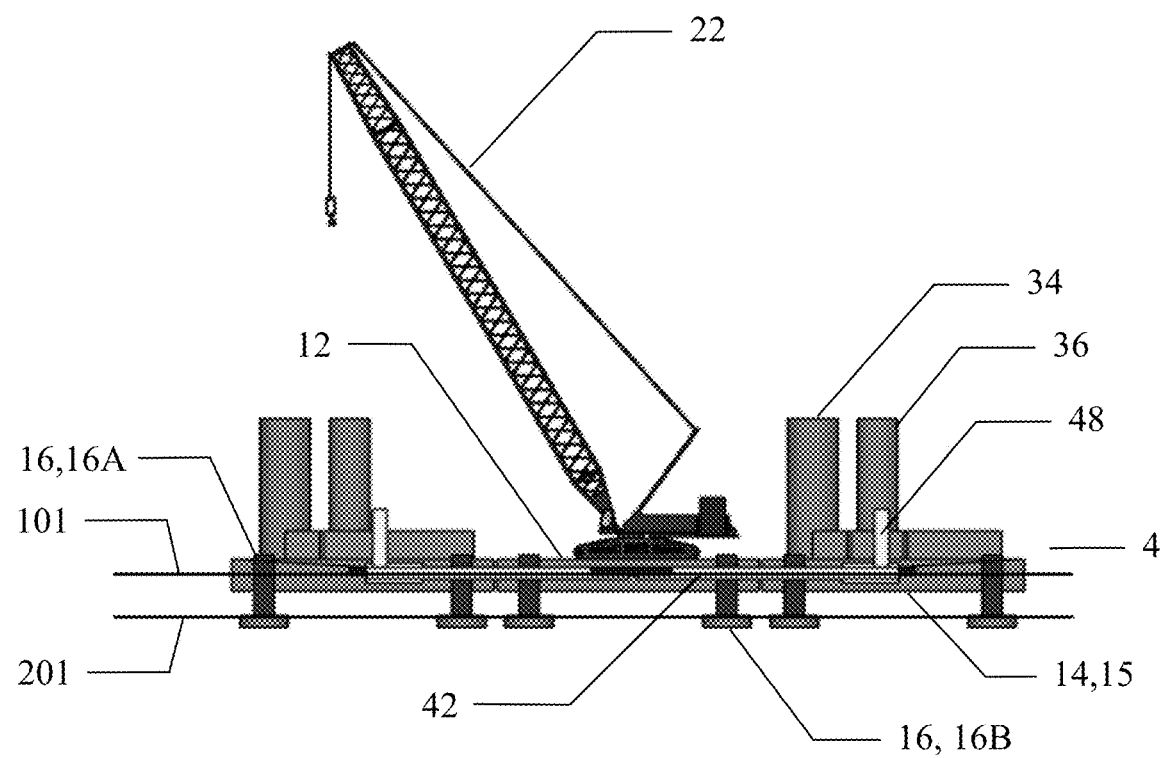
FIG. 10 is a schematic side view of an exemplary embodiment of the mobile modular floating hull assembly platform with the floating mat in accordance with the present invention.

With reference to FIG. 10, in some embodiments, the modular floating hull assembly platform system 4 is deployed in a water depth preferably between 5 to 15 meters wherein a top of each of the modules 12 and 14 and the floating mat 42 is above a waterline 101 and a bottom above a seafloor 201. Each of the modules 12 and 14 is supported by the modular legs 16 each having an upper part 16A rigidly connected to the rectangular hull 15 of each of the modules 12 and 14, and a lower part 16B firmly embedded below the seafloor 201.

Figure 11:
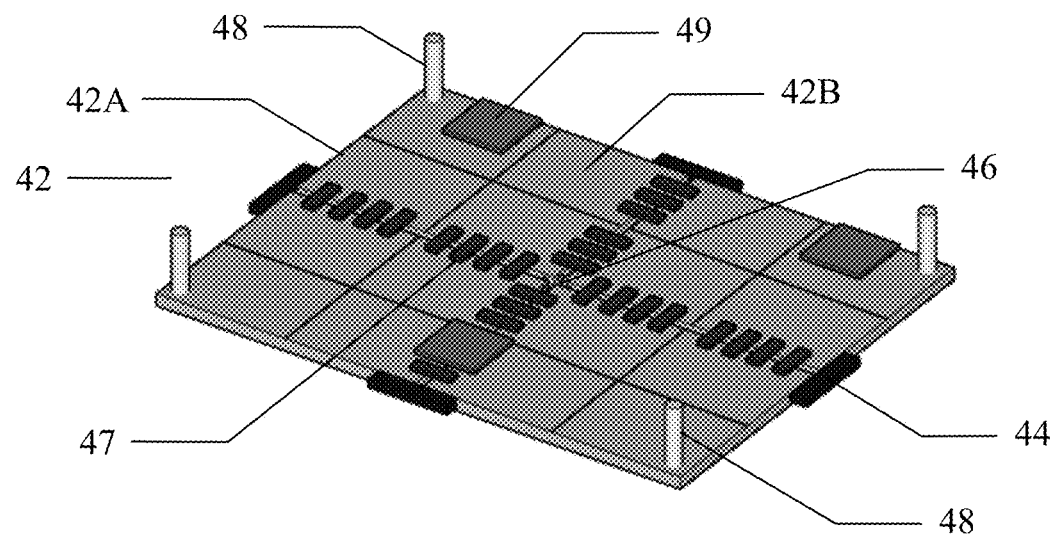
FIG. 11 is a schematic detailed perspective view of an exemplary embodiment of a modular floating mat with interconnecting elements and stability columns

With reference to FIG. 11, in some embodiments, the modular floating mat 42 comprises four mat modules 42A connected together rigidly by a plurality of external connectors 44 and internal connector 46 as well as link beams 47, and four vertical stability columns 48 extending upward each located at a perimeter corner of the floating mat 42. Designated areas 49 are provided for supporting heavy loads on the top deck of the floating mat 42. Each mat module 42A includes four watertight compartments 42B and a ballast system (not shown) for pumping water in and out of the compartments 42B during lowering and floating up operations of the floating mat 42.

Figure 12A:
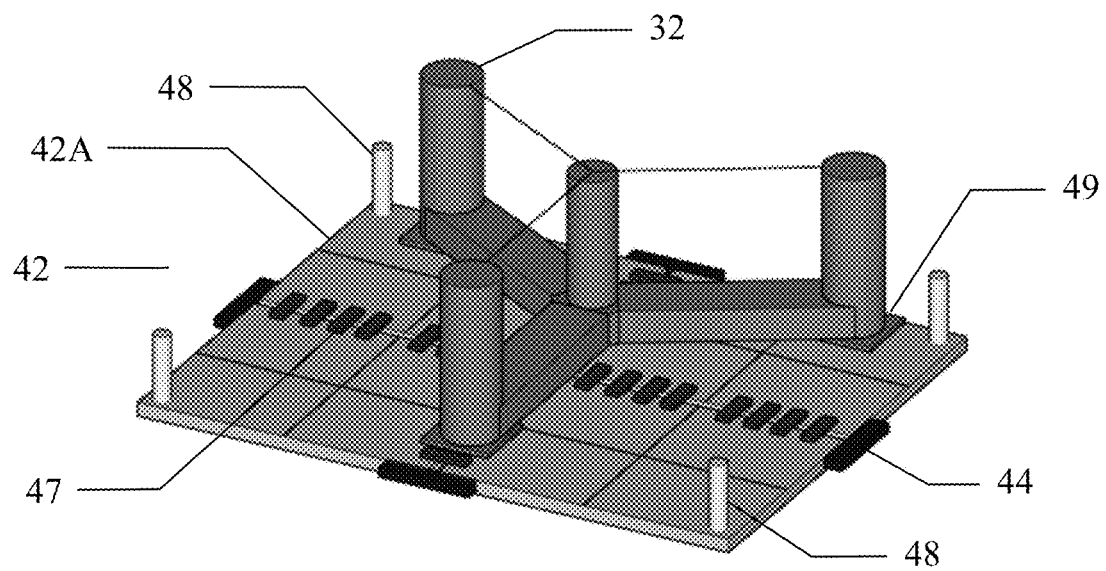
FIG. 12A is a schematic perspective view of an exemplary embodiment of the modular floating mat supporting a floating platform hull.

With reference to FIG. 12A, in some embodiments, a large semi-submersible floating platform hull 32 is supported by the modular floating mat 42 described above with reference to FIG. 11.

Figure 12B:
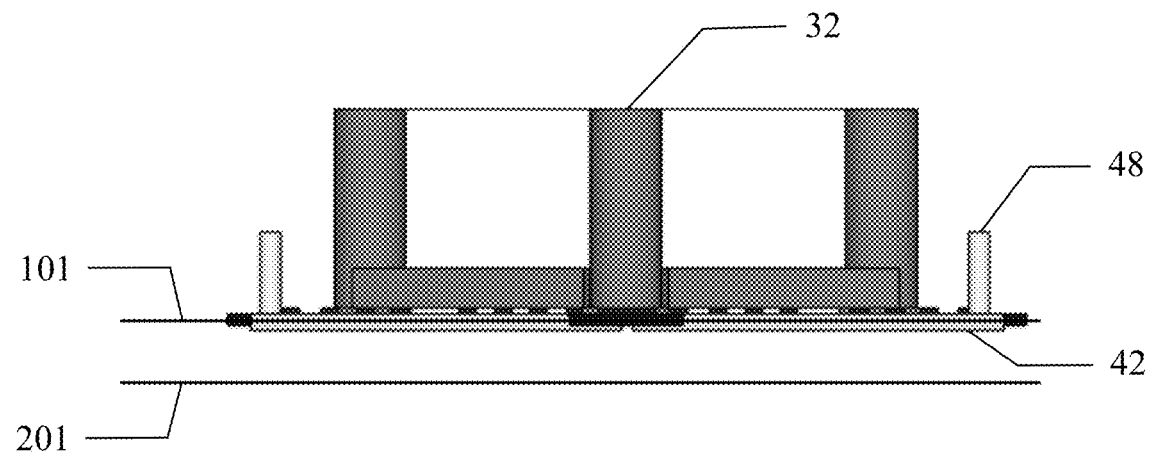
FIG. 12B is a schematic side view of an exemplary embodiment of the floating mat supporting the floating platform hull above a water line.

With reference to FIG. 12B, in some embodiments, the semi-submersible floating platform hull 32 sits on the floating mat 42 having the top deck above a waterline 101 and the bottom above a seafloor 201 during the assembly of the floating platform hull 32. Each of the stability columns 48 extends upward vertically and is coupled to the top deck of the floating mat 42 at a lower end.

Figure 12C:
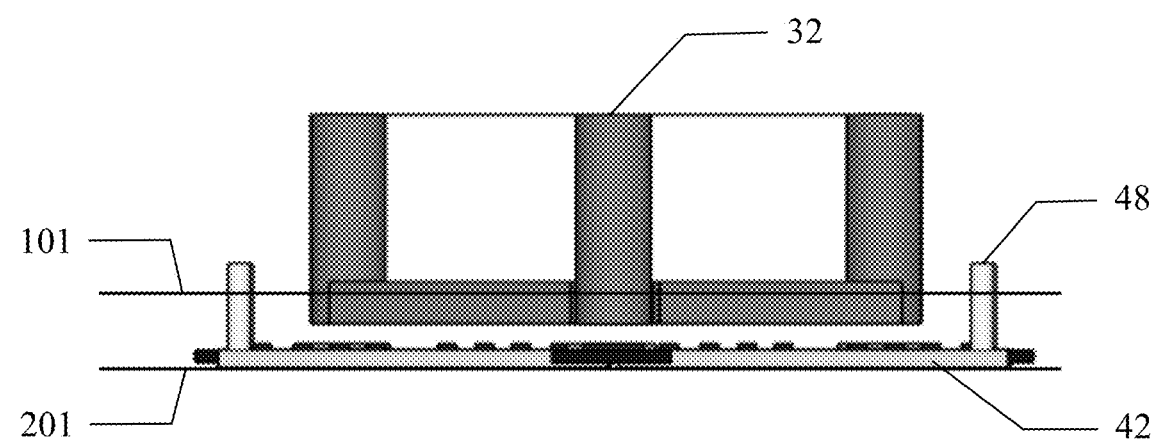
FIG. 12C is a schematic side view of an exemplary embodiment of the floating mat submerged onto a seafloor with the floating platform hull freely floating.

With reference to FIG. 12C, in some embodiments, the floating mat 42 is lowered to the sea floor 201 by water ballasting with the stability columns 48 having an upper end extending vertically above the waterline 101 to maintain stability of the floating mat 42 during the lowering process. When the floating mat is lowered to a certain depth, the floating platform hull 32 begins to detach from the floating mat 42 and floats independently on the waterline 101.

Figure 13:
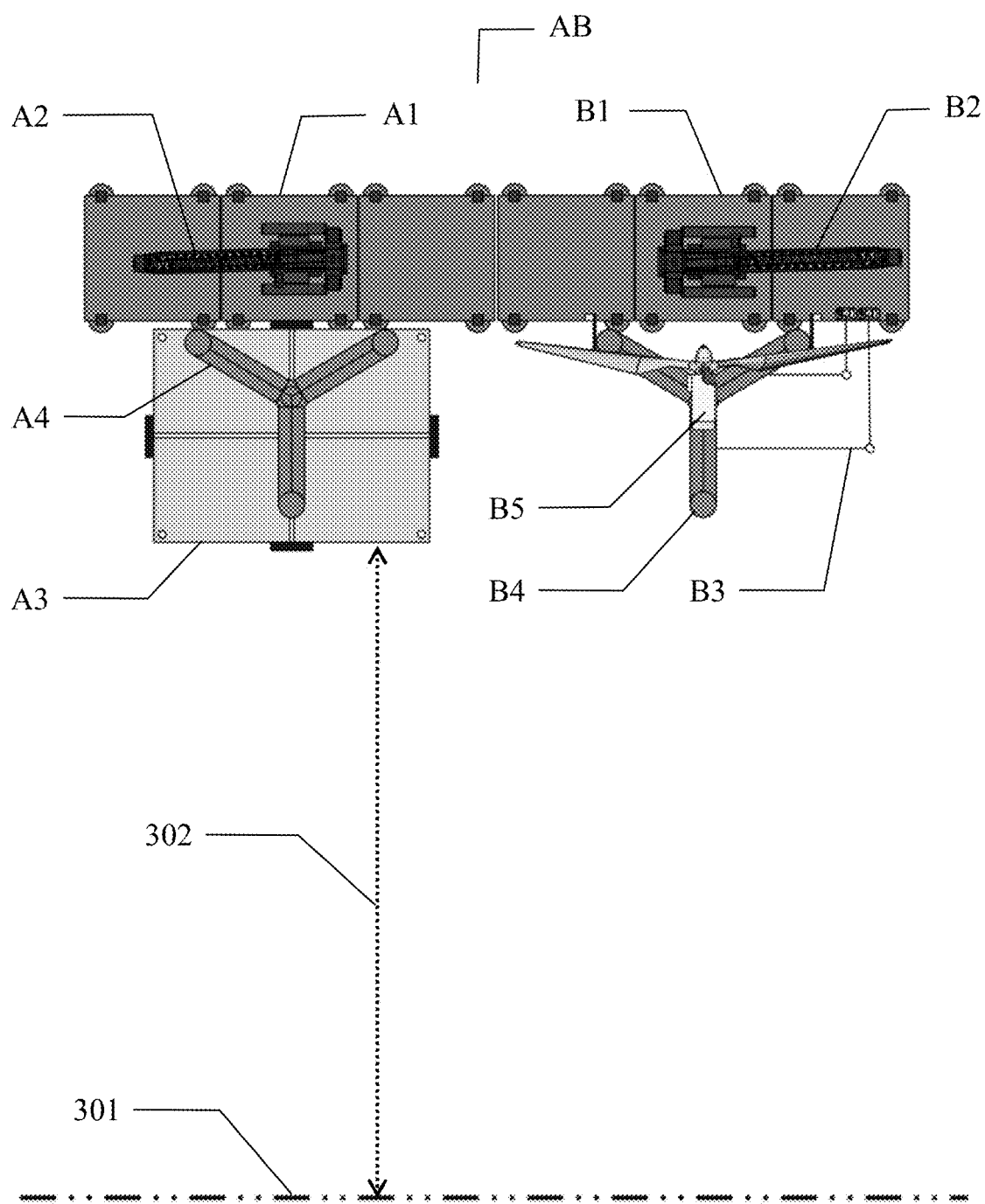
FIG. 13 is a schematic top view of an exemplary embodiment of a mobile modular floating wind assembly base consisting of a modular floating hull assembly platform with a floating mat and a modular wind turbine assembly platform located near a shoreline.

In some embodiments with reference to FIG. 13, a near-shore modular floating wind assembly base AB comprises a modular floating hull assembly platform A1 with a large crane A2 and a floating mat A3 supporting a floating platform hull A4, and a modular wind turbine assembly platform B1 with a large crane B2 and a pulling system B3. The floating wind assembly base AB is typically located at a distance 302 between 200 to 2000 meters from a shoreline 301 in a water depth 5 to 15 meters and has an overall length of 200 to 400 meters and a width of 30 to 60 meters with the modular floating hull assembly platform A1 and the modular wind turbine assembly platform B1 arranged in an end-to-end configuration. A long side of the floating wind assembly base AB is oriented towards the shoreline 301. This is to provide a wide protected area from the waves for waterborne operations such as the assembly of the floating platform hull A4 on the floating mat A3 and integration of the wind turbine B5 to a floating platform hull B4 on the long side the floating wind assembly base AB facing the shoreline 301.

With reference to FIGS. 14 to 24, in some embodiments, a method for assemble of floating wind turbines includes constructing a near-shore modular floating wind assembly base (FWAB) which comprises a modular wind turbine assembly platform (WTAP) and a modular floating hull assembly platform (FHAP) with a modular floating mat and assembling a floating platform hull and integrating a wind turbine to the floating platform hull. Specifically, the method includes a construction sequence of ten steps through three phases. The first phase is assembling the modular WTAP and FHAP with the modular floating mat from a plurality of prefabricated modules to form the modular near-shore FWAB (Steps I to III). The second phase is transporting and storing the floating platform hull components and wind turbine components onto the modular WTAP and FHAP of the FWAB and assembling the floating platform hull components on the floating mat and deploying the completed floating platform hull into the water by lowering the floating mat using water ballasting (Steps IV to VI). The third phase is moving the floating platform hull from the FHAP to the WTAP by using a pulling system and integrating the wind turbine components, including the tower, nacelle, and rotor blades, with the floating platform hull (Steps VII to X).

Figure 14:
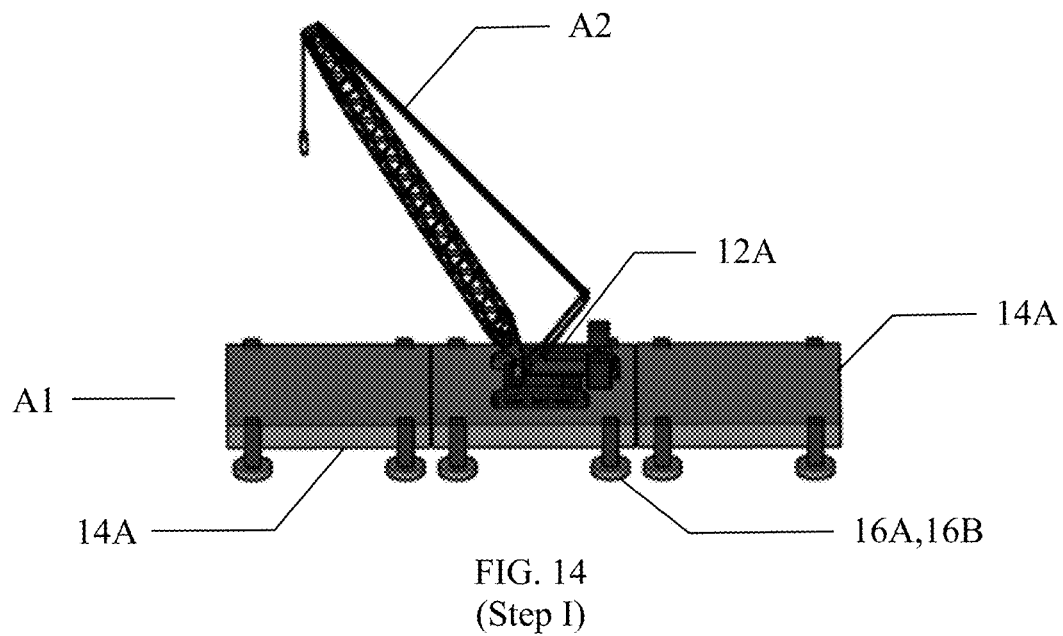
FIG. 14 is a schematic view of an exemplary embodiment of deploying a modular floating hull assembly platform during a 1st step of a method for assembling a floating platform hull and integrating it with a wind turbine in accordance with the present invention.

With reference to FIG. 14, in some embodiments, a Step I of the method involves deploying a modular floating hull assembly platform A1 comprising a crane module 12A with a large crane A2 and two work modules 14A at a near-shore site located at a distance between 200 and 2000 meters from a shoreline in a water depth ranging from 5 to 15 meters, wherein a long side of the floating hull assembly platform A1 is oriented towards the ocean and runs parallel to the shoreline. The crane module 12A and work modules 14A are supported by a plurality of retractable modular legs 16A with a lower part 16B firmly embedded below a seabed.

Figure 15:
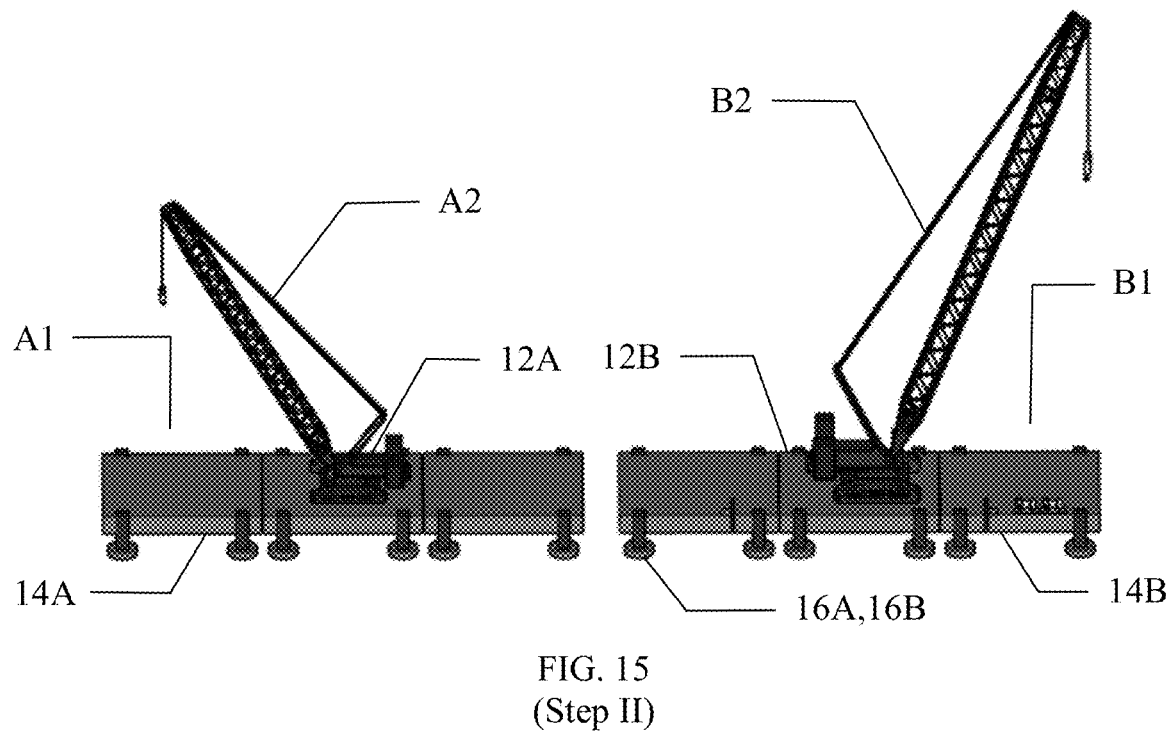
FIG. 15 is a schematic view of an exemplary embodiment of deploying a modular wind turbine assembly platform during a 2nd step of the method for assembling the floating platform hull and integrating it with the wind turbine in accordance with the present invention.

With reference to FIG. 15, in some embodiments, a Step II of the method involves deploying a modular wind turbine assembly platform B1 comprising a crane module 12B with a large crane B2 and two work modules 14B, adjacent to the floating hull assembly platform A1 in an end-to-end configuration at the near-shore site. The crane module 12B and work modules 14B are supported by a plurality of retractable modular legs 16A with a lower part 16B firmly embedded below a seabed.

Figure 16:
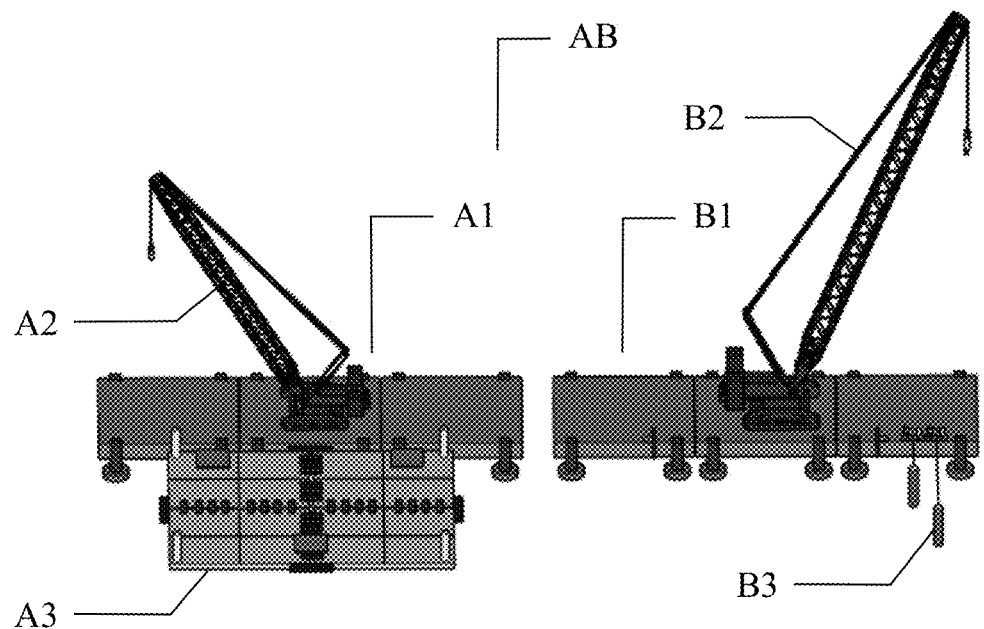
FIG. 16 is a schematic view of an exemplary embodiment of deploying a floating mat next to the floating hull assembly platform during a 3rd step of the method.

With reference to FIG. 16, in some embodiments, a Step III of the method involves deploying a modular floating mat A3 adjacent to the floating hull assembly platform A1 and a pulling system B3 adjacent to the wind turbine assembly platform B1, both on a long side of A1 and B1 facing the shoreline. This step completes the modular floating wind assembly base AB.

Figure 17:
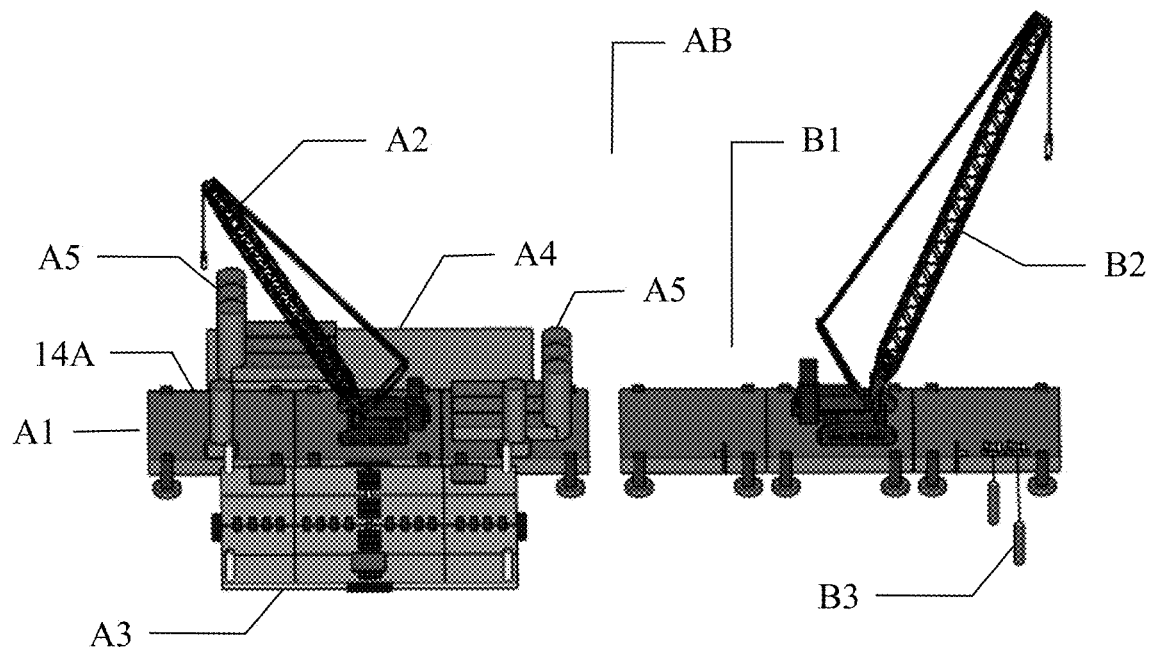
FIG. 17 is a schematic view of an exemplary embodiment of transporting, lifting, and storing a plurality of floating platform hull components on to the floating hull assembly platform during a $4^{th}$ step of the method.

With reference to FIG. 17, in some embodiments, a Step IV of the method involves berthing a transportation vessel A4 carrying a plurality of floating platform hull components A5 adjacent to the near-shore floating wind assembly base AB and utilizing the large crane A2 to lift and store the floating platform hull components A5 onto the work modules 14A of the floating hull assembly platform A1 with the floating mat A3.

Figure 18:
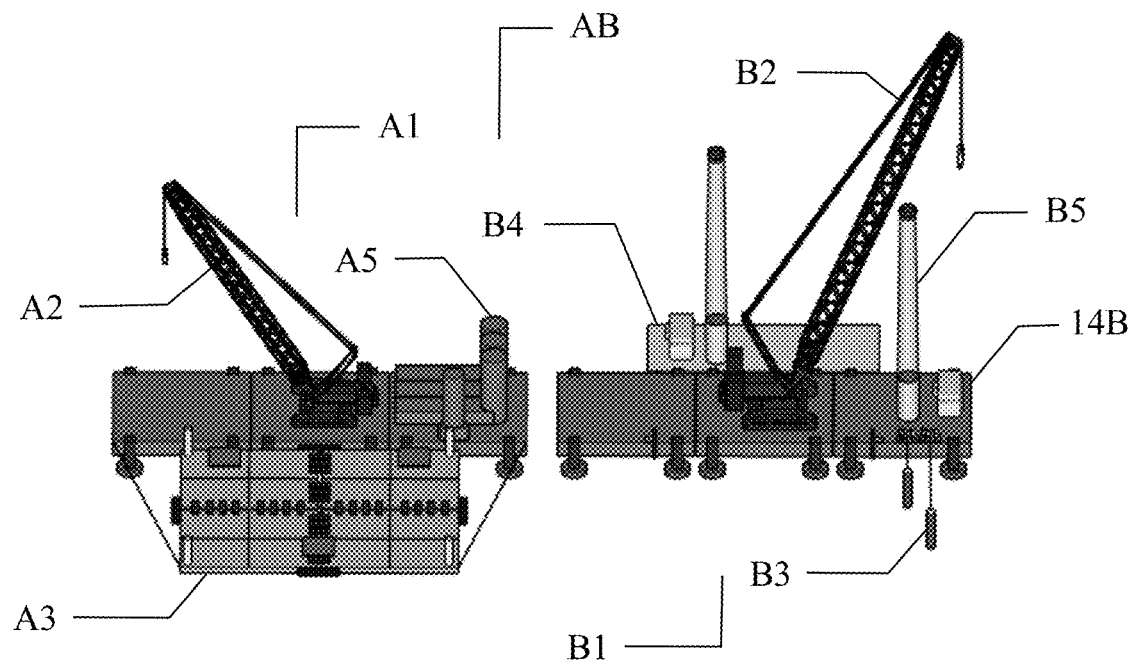
FIG. 18 is a schematic view of an exemplary embodiment of assembling the floating platform hull components on the floating mat during a $5^{th}$ step of the method.

With reference to FIG. 18, in some embodiments, a Step V of the method involves berthing a transportation vessel B4 carrying a plurality of wind turbine components B5 adjacent to the near-shore floating wind assembly base AB and utilizing the large crane B2 to lift and store the wind turbine components B5 onto the work modules 14B of the wind turbine assembly platform B1.

Figure 19:
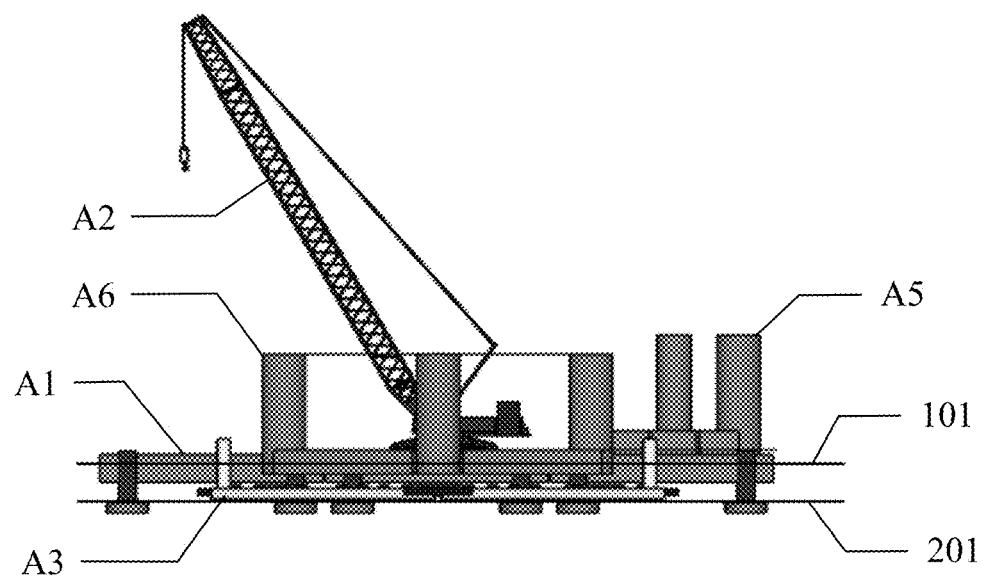
FIG. 19 is a schematic view of an exemplary embodiment of deploying the completed floating platform hull into the water by lowering the floating mat during a $6^{th}$ step of the method.

With reference to FIG. 19, in some embodiments, a Step VI of the method involves using the large crane A2 to lift the floating platform hull components A5 stored on the floating hull assembly platform A1 onto the floating mat A3 and complete the assemble of a floating platform hull A6, and lowering the floating mat A3 from a waterline 101 to a seafloor 201 by water ballast to allow the floating platform hull A6 to detach from the floating mat A3 and float freely by itself.

Figure 20:
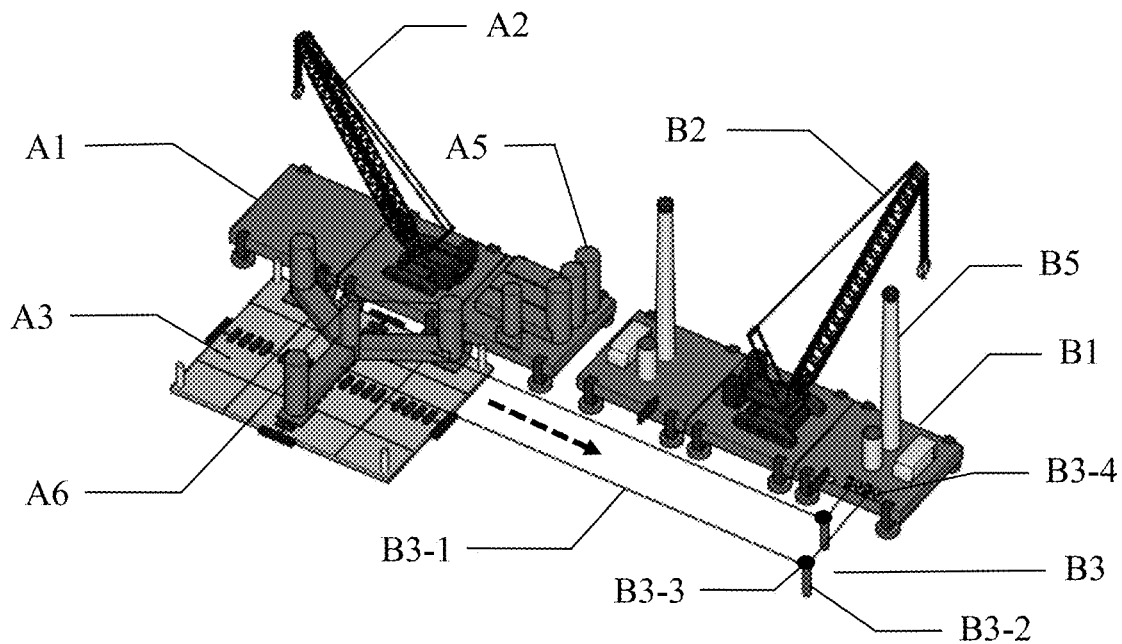
FIG. 20 is a schematic view of an exemplary embodiment of moving the completed floating platform hull to the wind turbine assembly platform during a 7$^{th}$ step of the method.

With reference to FIG. 20, in some embodiments, a Step VII of the method involves using the pulling system B3 to move the floating platform hull A6 from the floating hull assembly platform A1 to the wind turbine assembly platform B1. The pulling system B3 includes a plurality of wires B3-1 connected to the floating platform hull A6, posts B3-2 with sheaves B3-3 guiding the wires B3-1, and winches B3-4 mounted on the wind turbine assembly platform B1 pulling the wires B3-1.

Figure 21:
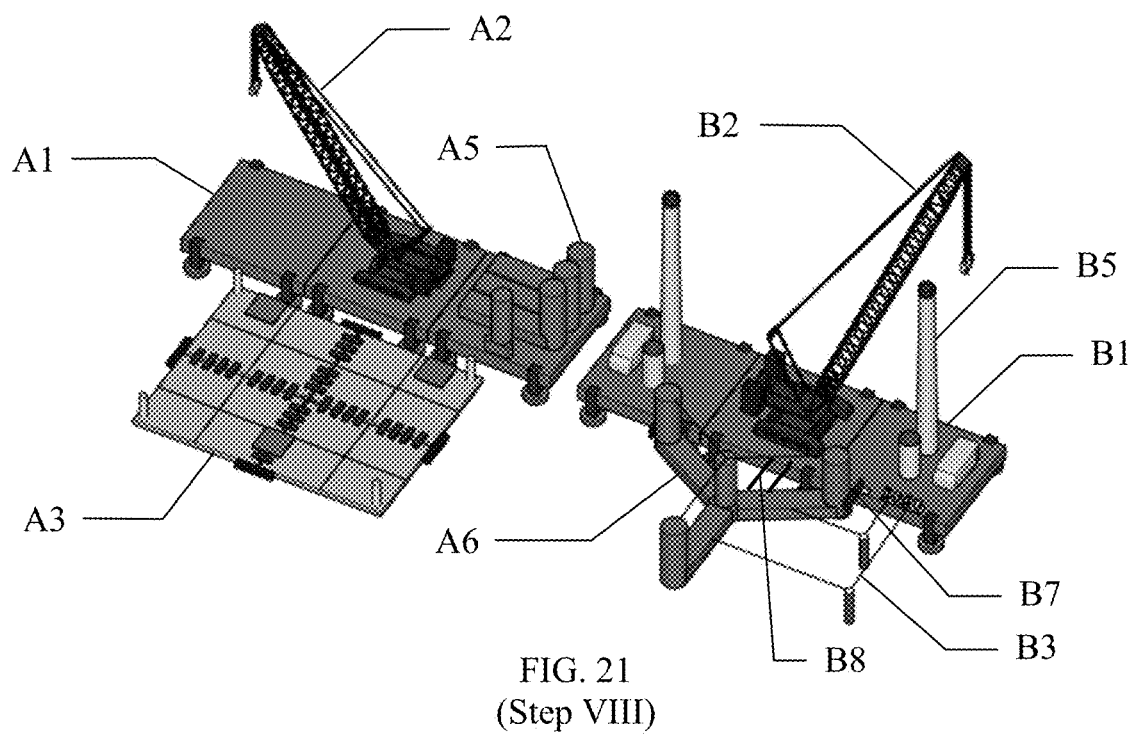
FIG. 21 is a schematic view of an exemplary embodiment of securing the completed floating platform hull at the wind turbine assembly platform during an 8$^{th}$ step of the method.

With reference to FIG. 21, in some embodiments, a Step VIII of the method involves securing the floating platform hull A6 to the long side of the wind turbine assembly platform B1 using a pair of adjustable outrigger systems B7 mounted on the wind turbine assembly platform B1 and a plurality of mooring lines B8 after the floating platform hull A6 is moved to position.

Figure 22A:
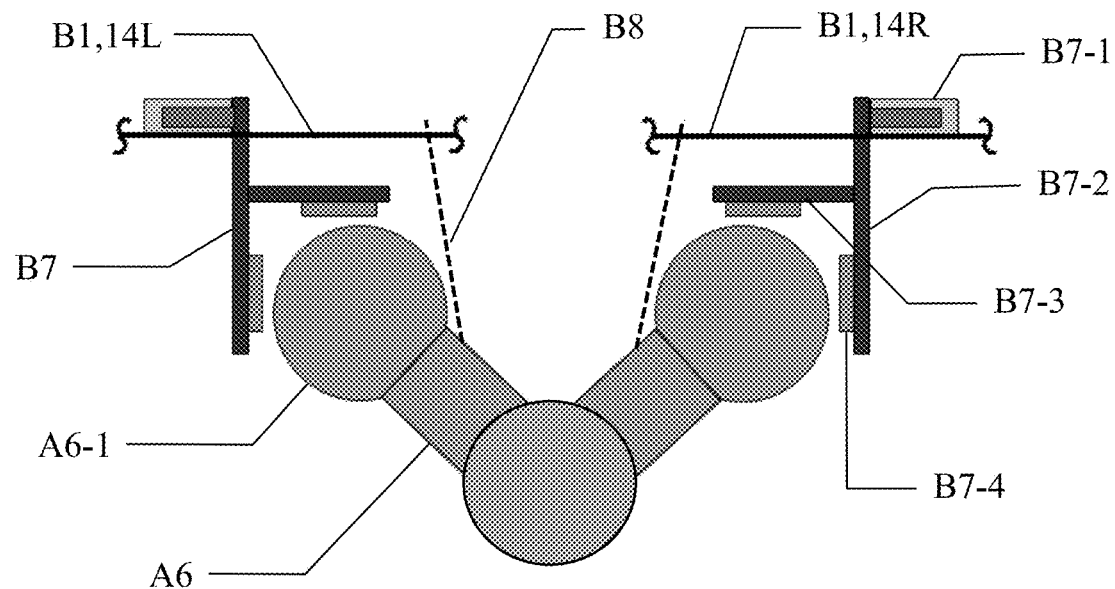
FIG. 22A is a schematic detailed view of an exemplary embodiment of an adjustable outrigger system for securing the floating platform hull at the wind turbine assembly platform.

With reference to FIG. 22A, in some embodiments, each of the adjustable outrigger systems B7 comprises a hydraulic cylinder unit B7-1 mounted on each of the work modules 14L and 14R of the wind turbine assembly platform B1, an outrigger arm B7-2 attached to an end of the hydraulic cylinder unit B7-1 extending perpendicularly outwards from the long side of the wind turbine assembly platform B1, and a fender beam B7-3 coupled to the outrigger arm B7-2 perpendicularly. Both the outrigger arm B7-2 and the fender beam B7-3 have a rubber pad B7-4 attached to a side facing a hull column A6-1 of the floating platform hull A6. The temporary mooring lines B8 are used to pull and secure the floating platform hull A6 towards the wind turbine assembly platform B1.

Figure 22B:
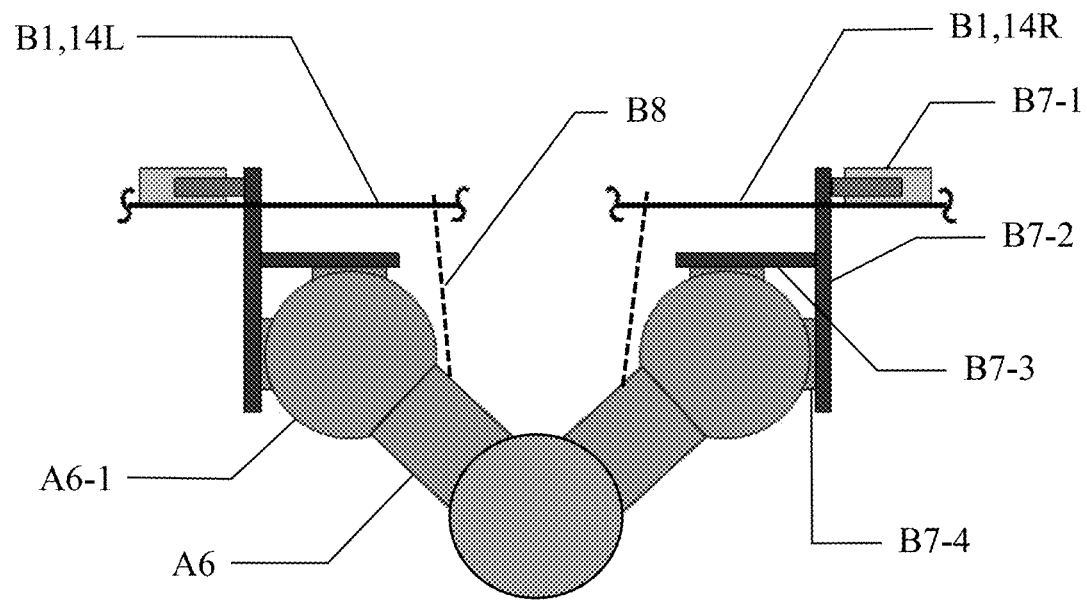
FIG. 22B is a schematic detailed view of an exemplary embodiment of the adjustable outrigger system fully in contact with the floating platform hull at the wind turbine assembly platform.

With reference to FIG. 22B, in some embodiments, each of the hydraulic cylinder units B7-1, with a piston thrust rod, pushes the outrigger arm B7-2 with the rubber pad B7-4 to establish a firm contact with a side of the hull column A6-1 of the floating platform hull A6. The fender beams B7-3, with the rubber pads B7-4 attached, are also brought into a firm contact with the hull columns A6-1 by tightening the mooring lines B8. This helps to eliminate the relative horizontal motions between the floating platform hull A6 and the work modules 14L and 14R of the wind turbine assembly platform B1 during the lift and integration of the wind turbine tower, nacelle, and rotor blades.

Figure 23:
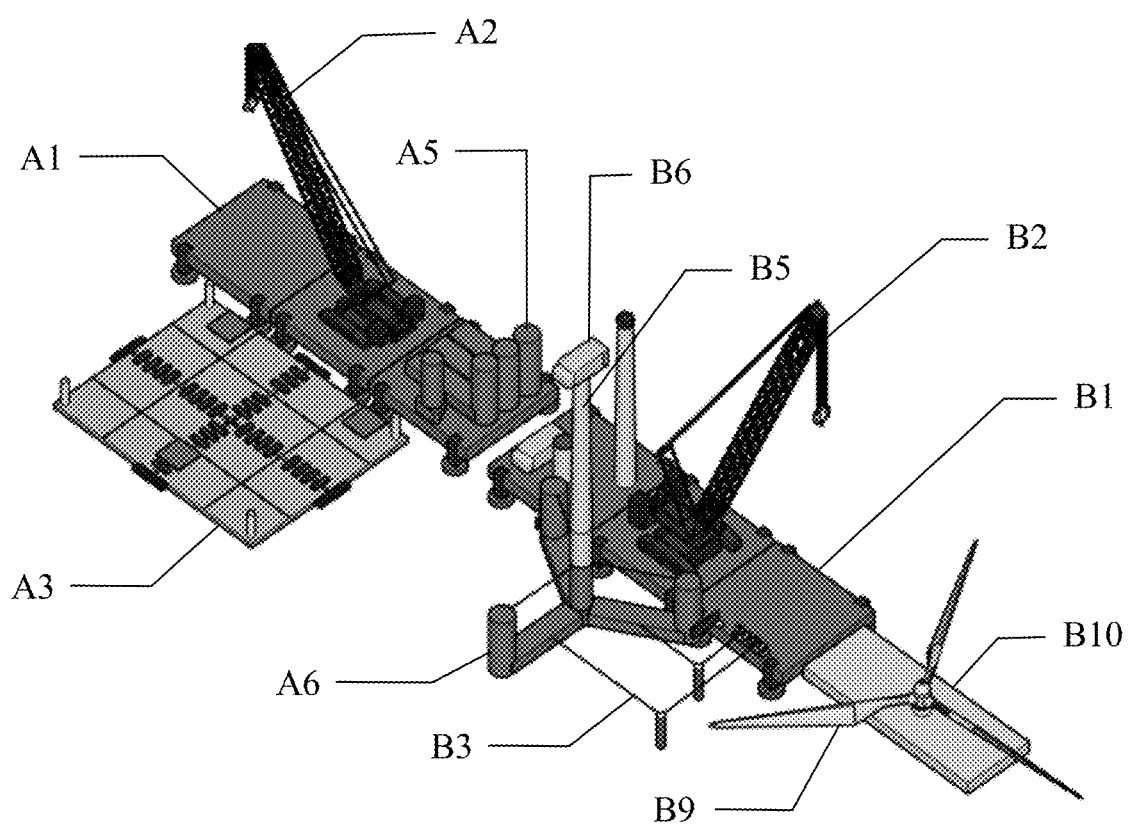
FIG. 23 is a schematic view of an exemplary embodiment of installing the wind tower and nacelle onto the floating platform hull at the wind turbine assembly platform during a 9$^{th}$ step of the method.

With reference to FIG. 23, in some embodiments, a Step IX of the method involves using the large crane B2 to first lift and install the wind turbine tower B5 and then the nacelle B6, both temporarily stored on the wind turbine assembly platform B1, onto the floating platform hull A6. The rotor blades assembly B9 is then lifted from a transportation barge B10 which is berthed at an end of the wind turbine assembly platform B1 to integrate with the nacelle B6.

Figure 24:
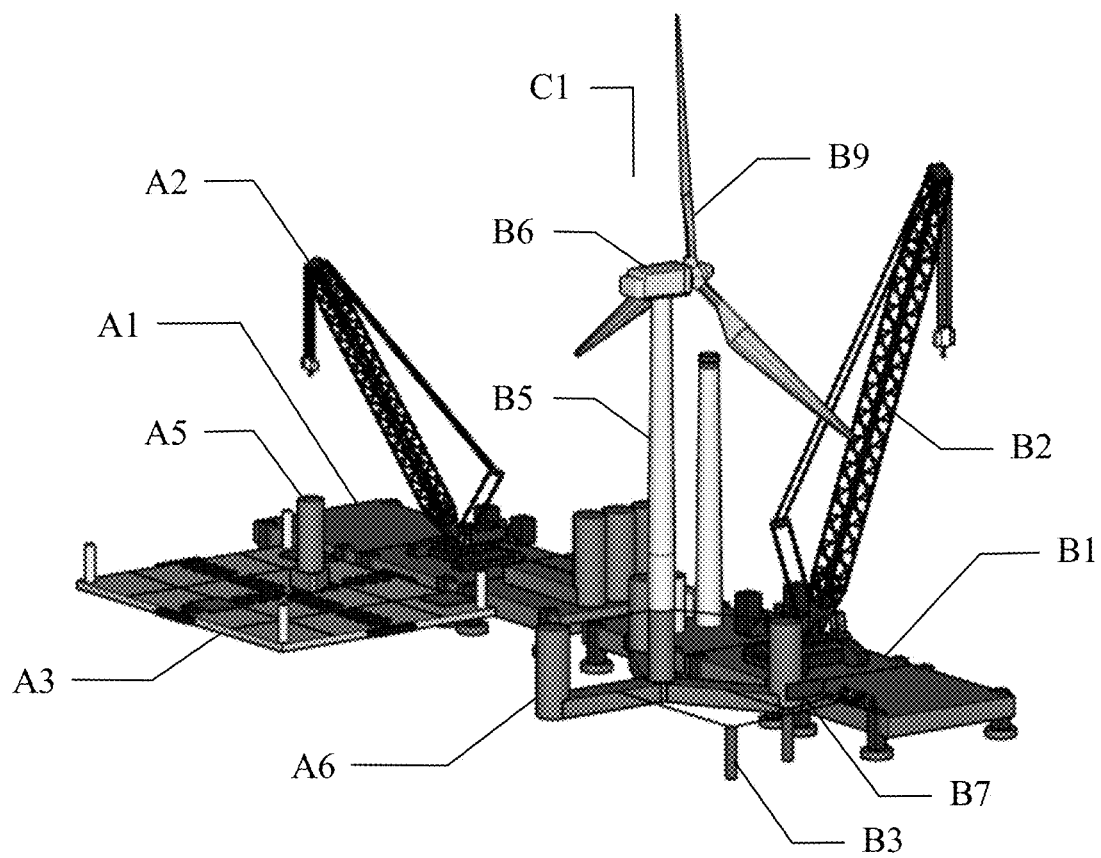
FIG. 24 is a schematic view of an exemplary embodiment of integrating the nacelle and rotor blades with the floating platform hull to complete the floating offshore wind turbine unit at the wind turbine assembly platform during a 10$^{th}$ step of the method.

With reference to FIG. 24, in some embodiments, a Step X of the method involves integrating and commissioning the wind turbine components B5, B6 and B9 together with the floating platform hull A6 to complete an entire floating offshore wind turbine unit C1. The pulling system B3 and the adjustable outrigger systems B7 are released to allow the completed floating offshore wind turbine unit C1 to be ready for sea-towing to an offshore wind farm site for final installation. In the meantime, the floating mat A3 floats up to the waterline by de-ballasting. The large crane A2 is then used to lift a second floating hull component A5, which is stored on the floating hull assembly platform A1, onto the floating mat A3 to start the assembling process for a second floating platform hull.

The Steps IV to X are repeated for every floating offshore wind turbine unit until all the units are completed and deployed to the offshore wind farm. Once all the floating offshore wind turbine units are deployed, the entire near-shore modular floating wind assembly base may be disassembled and relocated to another location for a new project.

An alternative feature of the method is that the WTAP and FHAP can also be deployed independently at different near-shore locations for their intended purposes, providing further flexibility to projects for large-scale deployment of floating wind turbines. For example, if a project has the floating platform hulls assembled at an overseas yard and transported to a near-shore site on the West Coast of the U.S., the FHAP will not be needed, and only the WTAP will be used for the assembly and integration of the wind turbine components onto the floating platform hull.

Figure 25:
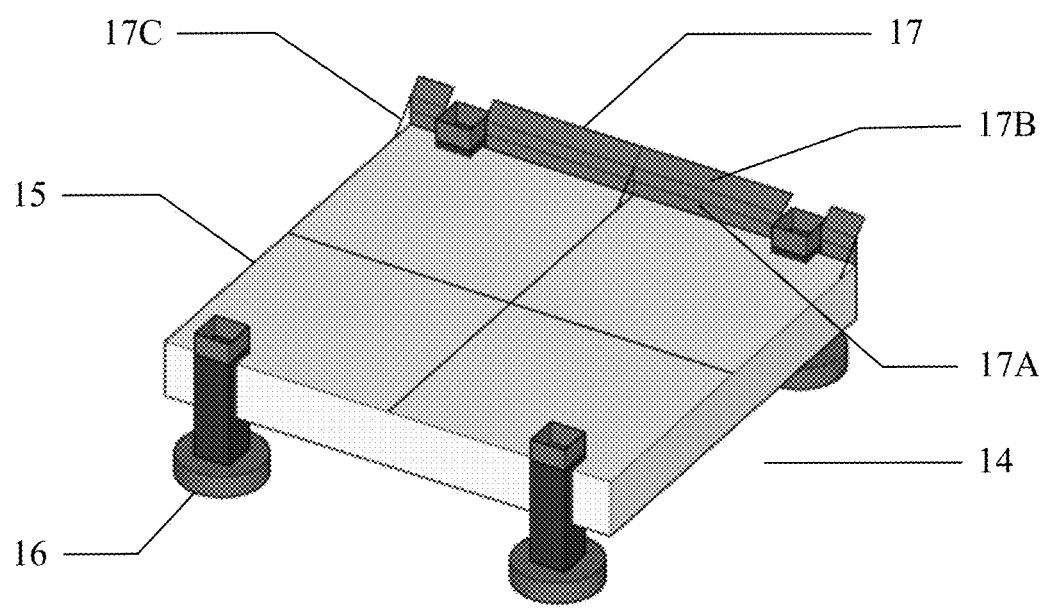
FIG. 25 is a schematic detailed prospective view of an exemplary embodiment of a wave barrier structure installed on a module of the mobile modular wind turbine assembly platform.

With reference to FIG. 25, in some embodiments, a wave barrier structure 17 is installed on a long side, not facing the shoreline, of the rectangular hull of the work module 14, extending upward to protect the wind turbine components temporarily stored on it from wave run-ups. The wave barrier structure 17 comprises a lower part 17A which is vertically attached to the side of the module 14, an upper part 17B which is inclined at an angle of 30 to 45 degrees upward and outward towards the ocean, and a plurality of diagonal bracings 17C which provide lateral support to the wave barrier structure 17. The wave barrier structure 17 may be installed on all crane modules and work modules of the WTAP and FHAP on the long side not facing the shoreline.

The above descriptions and figures are exemplary embodiments of the present invention and preferred main features of bottom-founded mobile modular platforms and a method for near-shore assembly and integration of floating offshore wind turbines. The embodiments described herein are just a few examples of the present invention, which covers various alternative designs, configurations, and modifications that fall within the scope of the claims. It will be appreciated by those skilled in the art that the present invention provides a versatile and cost-effective solution for the deployment of floating offshore wind turbines, which can be tailored to different sites and conditions. The modular platforms described herein are preferably constructed of steel and have a service water depth range of 5 to 15 meters, with a deployment distance from the shoreline of 200 to 2000 meters. However, it should be understood that the present invention is not limited to these specific parameters, and the modular platforms may be deployed in water depths less than 15 meters and at distances greater than 2000 meters from the shoreline. Additionally, the modular platforms are not limited to the assembly and integration of floating platforms and offshore wind turbines and may also be utilized for the assembly and integration of fixed-bottom offshore wind foundations and turbine systems for shallow water offshore wind farms. Any modifications, equivalents, and alternatives to the preferred embodiments described herein are within the spirit and scope of the present invention.

In conclusion, the present invention addresses the challenge of deploying floating offshore wind turbines in locations without suitable landside assembly yards and deepwater seaports. To solve this problem, the invention proposes a mobile modular floating wind assembly base comprising a wind turbine assembly platform and a floating hull assembly platform and a method for near-shore assembly and integration of the floating platform hulls and wind turbines. The modular floating wind assembly base and the method are designed to be versatile, scalable, and can be tailored to various site conditions. The invention offers a practical and cost-effective solution for large-scale deployment of floating offshore wind turbines in coastal areas with limited seaport infrastructure. The modular and mobile nature of the floating wind assembly base also enables easy removal and relocation, thereby significantly reducing the carbon footprint and potential environmental impact to the ocean coast compared with the conventional method of building new assembly yards and seaports.

What is claimed is:

1. A method for assembly of a floating offshore wind turbine, comprising:
   a modular floating hull assembly platform having a first crane module with a first crane and at least one work module, wherein each of the modules having a rectangular hull with a flat top deck above a waterline;
   a plurality of floating hull components stored temporarily on the work modules of the floating hull assembly platform;
   a modular floating mat providing a dry area above the waterline for assembling the floating platform hull components;
   a modular wind turbine assembly platform having a second crane module with a second crane and at least one work module, wherein each of the modules having a rectangular hull with a flat top deck above the waterline;
   a plurality of wind turbine components including tower sections, nacelles and rotor blades stored temporarily on the work modules of the wind turbine assembly platform;
   a plurality of module legs each having an upper part and a lower part;
   a pulling system comprising a plurality of wires, posts with sheaves guiding the wires, and winches for pulling the wires;
   a modular floating wind assembly base comprising the modular floating hull assembly platform and the modular wind turbine assembly platform arranged in an end-to-end configuration, wherein each of the crane modules and work modules is supported by four module legs, wherein each leg having an upper part rigidly connected to the rectangular hull of each of the modules and a lower part firmly embedded below a seafloor;

a temporary floating configuration wherein each of the crane modules and work modules of the floating wind assembly base having the module legs retracted upwards with the upper part rigidly connected to the rectangular hull of each of the modules and the lower part retracted to a bottom of the rectangular hull of the module above the seafloor, and the method further comprising:

Step I, deploying a modular floating hull assembly platform comprising the first crane module with the first crane and two work modules, wherein the first crane module is arranged in the middle between the two work modules in an end-to-end configuration at a near-shore site located at a distance between 200 and 2000 meters from the shoreline in a water depth ranging from 5 to 15 meters, wherein a long side of the floating hull assembly platform faces the shoreline, wherein the first crane module and the two work modules are supported by the module legs each having the upper part rigidly connected to the rectangular hull of each of the modules and the lower part firmly embedded below the seafloor.

2. The method of claim 1, further comprising,

Step II, deploying a modular wind turbine assembly platform comprising the second crane module with the second crane and two work modules, wherein the second crane module is arranged in the middle between the two work modules in an end-to-end configuration at the near-shore site adjacent to an end of the modular floating hull assembly platform, wherein a long side of the wind turbine assembly platform faces the shoreline, wherein the second crane module and the two work modules are supported by the module legs each having the upper part rigidly connected to the rectangular hull of each of the modules and the lower part firmly embedded below the seafloor, wherein each of the two work modules is equipped with an adjustable outrigger system on the long side of the module facing the shoreline;

Step III, deploying and securing the modular floating mat adjacent to the floating hull assembly platform on the long side facing the shoreline, and installing the pulling system adjacent to the wind turbine assembly platform on the long side facing the shoreline, wherein the floating hull assembly platform with the modular floating mat and the wind turbine assembly platform with the pulling system forms the modular floating wind assembly base.

3. The method of claim 1, further comprising,

Step IV, berthing a transportation vessel carrying a plurality of floating hull components and utilizing the first crane on the first crane module to lift and store the floating hull components onto the work modules of the floating hull assembly platform, and Step V, berthing a transportation vessel carrying a plurality of wind turbine components and utilizing the second crane on the second crane module to lift and store the wind turbine components onto the work modules of the wind turbine assembly platform.

4. The method of claim 1, further comprising,

Step VI, using the first crane on the first crane module to lift the floating hull components stored on the floating hull assembly platform onto the floating mat, completing the assemble of a floating platform hull, and lowering the floating mat to the seafloor by water ballast to allow the floating platform hull to detach from the floating mat and float freely by itself.

5. The method of claim 1, further comprising,

Step VII, utilizing the pulling system to move the floating platform hull from the floating hull assembly platform to the wind turbine assembly platform, and Step VIII, securing the floating platform hull to the side of the wind turbine assembly platform by using a plurality of mooring lines and a pair of adjustable outrigger systems on the two work modules of the wind turbine assembly platform, wherein each of the adjustable outrigger systems comprises a hydraulic cylinder unit mounted on each of the two work modules of the wind turbine assembly platform, an outrigger arm attached to an end of the hydraulic cylinder unit extending perpendicularly outwards from a side of the wind turbine assembly platform, and a fender beam coupled to the outrigger arm perpendicularly, wherein each of the outrigger arms and the fender beams having a rubber pad in firm contact to a side of a hull column of the floating platform hull to eliminate relative horizontal motions between the floating platform hull and the wind turbine assembly platform.

6. The method of claim 1, further comprising,

Step IX, utilizing the second crane on the second crane module to lift and install the wind turbine components, first the tower, then the nacelle, both temporarily stored on the floating hull assembly platform, onto the floating platform hull, followed by lifting the rotor blades assembly from a transportation barge which is berthed at an end of the wind turbine assembly platform and coupling the rotor blades assembly to the nacelle.

7. The method of claim 1, further comprising,

Step X, integrating and commissioning the wind turbine components together with the floating platform hull to complete an entire assembly of a floating offshore wind turbine unit, wherein the pulling system, the adjustable outrigger systems and the mooring lines are released to allow the completed floating offshore wind turbine unit to be ready for sea-towing to an offshore wind farm site.

8. The method of claim 1, further comprising, deploying the modular floating hull assembly platform with the floating mat and the modular wind turbine assembly platform independently at different sites, wherein the modular floating hull assembly platform with the floating mat is deployed at a first near-shore site for assembling a floating platform hull, wherein the modular wind turbine assembly platform is deployed at a second near-shore site for assembling and integrating wind turbine components including tower sections, nacelle and rotor blades onto a floating platform hull to form a complete floating offshore wind turbine unit.

* * * * *